(12) United States Patent
Xue et al.

(10) Patent No.: US 8,112,033 B2
(45) Date of Patent: Feb. 7, 2012

(54) DATA RELAY APPARATUS, COMMUNICATION APPARATUS AND COMMUNICATION METHOD

(75) Inventors: Jinyin Xue, Beijing (CN); Jianming Wu, Kawasaki (JP); Jun Tian, Beijing (CN); Hua Zhou, Beijing (CN)

(73) Assignee: Fujitsu Limited, Kawasaki (JP)

( * ) Notice: Subject to any disclaimer, the term of this patent is extended or adjusted under 35 U.S.C. 154(b) by 267 days.

(21) Appl. No.: 12/646,377

(22) Filed: Dec. 23, 2009

(65) Prior Publication Data
US 2010/0203826 A1    Aug. 12, 2010

(30) Foreign Application Priority Data
Feb. 10, 2009  (CN) .......................... 2009 1 0006347

(51) Int. Cl.
*H04B 7/15* (2006.01)
(52) U.S. Cl. .......... 455/11.1; 455/7; 455/12.1; 370/274; 370/279; 370/315; 370/492
(58) Field of Classification Search ............... 455/3.02, 455/427, 7, 11.1, 12.1, 13.1, 13.2, 16; 370/226, 370/293, 246, 274, 279, 315, 316, 492, 501
See application file for complete search history.

(56) References Cited

U.S. PATENT DOCUMENTS

| | | | | |
|---|---|---|---|---|
| 6,370,185 | B1* | 4/2002 | Schmutz et al. | 375/214 |
| RE42,021 | E * | 1/2011 | Pollmann et al. | 375/222 |
| 2003/0143962 | A1* | 7/2003 | Boariu | 455/106 |
| 2007/0217541 | A1 | 9/2007 | Liu et al. | |
| 2008/0152029 | A1* | 6/2008 | Kwon et al. | 375/260 |
| 2008/0219251 | A1 | 9/2008 | Xue et al. | |
| 2009/0279475 | A1* | 11/2009 | Vanderaar et al. | 370/321 |
| 2009/0291700 | A1* | 11/2009 | Callard et al. | 455/503 |
| 2010/0118768 | A1* | 5/2010 | Thesling | 370/316 |
| 2010/0322149 | A1* | 12/2010 | Agarwal | 370/316 |
| 2011/0255623 | A1* | 10/2011 | Golitschek Edler Von Elbwart et al. | 375/261 |

OTHER PUBLICATIONS

Larsson et al., "Coded Bi-directional Relaying"; 5th Scandinavian WS on Wireless Ad-Hoc Networks (AdHoc '05), Stockholm, Sweden, May 2005.
Popovski et al., "Wireless Network Coding by Amplify-and-Forward for Bi-Directional Traffic Flows"; IEEE Communication Letters, vol. 11, No. 1, Jan. 2007.
Katti et al., "XORs in the Air: Practical Wireless Network Coding"; SIGCOMM '06; Pisa, Italy, Sep. 11-15, 2006.

* cited by examiner

*Primary Examiner* — Dominic E Rego
(74) *Attorney, Agent, or Firm* — Myers Wolin, LLC.

(57) ABSTRACT

A data relay apparatus includes a first demodulating unit, demodulating a modulation signal of a first modulation mode from a first transmission source; a second demodulating unit, demodulating a modulation signal from a second transmission source, having a modulation mode higher than the first modulation mode; a combination controlling unit, providing a mapping rule necessary for performing signal combination in accordance with the modulation mode of the modulation signal from each of the first and second transmission source, the mapping rule to map the demodulated modulation signal from the first transmission source together with the demodulated modulation signal from the second transmission source to a constellation of symbols of the second modulation mode; a data combining unit, performing data combination on the demodulated modulation signal from the first transmission source and the demodulated modulation signal from the second transmission source according to the mapping rule.

10 Claims, 11 Drawing Sheets

(a)

(b)

DATA RELAY APPARATUS, COMMUNICATION APPARATUS AND COMMUNICATION METHOD

CROSS REFERENCE TO RELATED APPLICATIONS

This application is based upon and claims the benefit of priority of the prior Chinese Patent Application No. 200910006347.6, filed on Feb. 10, 2009, now pending, the contents of which are herein wholly incorporated by reference.

FIELD OF THE INVENTION

This invention relates to relay technologies in a communications system. This invention relates to the technology of combining and separating modulation symbols in the communications system.

BACKGROUND OF THE INVENTION

Since the frequency band resource of the transmission channel is always restricted in a communications system, it is one of the most important indices for the communications system to seek to enhance transmission efficiency. To guarantee anti-interference performance and spectrum utilization ratio of the communications system, channel coding and symbol modulating technologies are widely applied in the communications system.

Quadrature amplitude modulation (QAM) is a modulation mode frequently employed in the communications system. QAM is a technology of modulation combining amplitude with phase, and makes simultaneous use of the amplitude and phase of a carrier to transmit information bits, so that higher frequency band utilization ratio can be achieved in the condition of identical minimum distances between constellation points. Similar to other digital modulation modes, a QAM modulation symbol set can be conveniently expressed by a constellation, on which each constellation point corresponds to one point in the symbol set.

On the other hand, for instance with regard to a relay system, a relay link is established between a mobile or stationary relay station (RS) and a stationary base station or a stationary RS in the network. A mobile terminal (also referred to as the mobile station) makes use of the relay link of the mobile or stationary relay station to which it belongs to communicate with the base station. Since the RS is capable of communicating between network devices to interchange information of a plurality of mobile terminals and to collect and distribute communication data between the terminals and the base station, it is possible to achieve maximization of the communication link efficiency between the network devices and to provide better communication quality.

The relay station processes signals mainly in two modes. The simplest one is the "Amplify and Forward" (AF) mode, whereby the relay station merely amplifies the received signal according to a certain coefficient. Another mode is referred to as "Decoder and Forward" (DF), whereby the relay station demodulates the signal and decodes it as the original information, and then encodes and modulates the same again for transmission. This mode can enhance signal quality in the case the channel condition is good, but if the relay station erroneously decodes, error propagation will be present in the forwarded signal, and it is also impossible for the mobile station to recover. There is also "Estimate and Forward" mode among others.

In another technology called cooperative diversity, both receiving and forwarding of data are relayed and enhanced via the mobile terminal. There are also the aforementioned two modes of AF and DF for processing the signal.

In the foregoing mechanism for receiving and forwarding data, the data receiving operation and forwarding operation can be performed either separately or in hybrid. Three relatively typical forwarding modes are respectively shown in FIGS. 1-3.

FIG. 1 illustrates the conventional bidirectional relay process. As shown in FIG. 1, the base station and the mobile station respectively transmit data to the relay station at different timings (frequencies), and the relay station then forwards data respectively to the base station and the mobile station at different timings (frequencies), in which altogether four periods of time are needed. Specifically, in the example as shown in FIG. 1, the base station transmits to the relay station data to be forwarded to the mobile station in the first time slot, and the relay station receives the data. The mobile station transmits to the relay station data to be forwarded to the base station in the second time slot, and the relay station receives the data. In the third time slot the relay station forwards the data received from the base station at the first time slot to the mobile station, and in the fourth time slot the relay station forwards the data received from the mobile station at the second time slot to the base station.

FIG. 2 illustrates the mode of separated reception and combined transmission. As shown in FIG. 2, the base station and the mobile station respectively transmit data to the relay station at different timings (frequencies), and the relay station receives the two branches of data and then combines them into one branch of data to be simultaneously (or in the same frequency) forwarded to the base station and the mobile station. Upon reception of the data forwarded by the relay station, the base station and the mobile station decode or recover the data. Altogether three periods of time are needed. Specifically, in the example as shown in FIG. 2, the base station transmits to the relay station data to be forwarded to the mobile station in the first time slot, and the relay station receives the data. The mobile station transmits to the relay station data to be forwarded to the base station in the second time slot, and the relay station receives the data. In the third time slot the relay station combines the data received from the base station at the first time slot with the data received from the mobile station at the second time slot, and then forwards the data to the base station and the mobile station simultaneously (or in the same frequency).

FIG. 3 illustrates the bidirectional hybrid forwarding mode, whereby the base station and the mobile station transmit data to the relay station at the same timing (frequency), and the relay station forwards the relay data to both of the base station and the mobile station simultaneously (or in the same frequency) after receiving and processing the data, in which altogether two time periods are needed. Specifically, in the example as shown in FIG. 3, the base station transmits to the relay station data to be forwarded to the mobile station in the first time slot, and at the same time the mobile station transmits to the relay station data to be forwarded to the base station. The relay station simultaneously receives the data from the base station and the data from the mobile station. In the second time slot the relay station combines the data received from the base station with the data received from the mobile station at the first time slot, and then forwards the data to the base station and the mobile station simultaneously (or in the same frequency).

As can be seen from FIGS. 1-3, the bidirectional hybrid forwarding mode occupies the least channel resource (time period), and is relatively high in spectrum utilization ratio, but data processing thereof is relatively complicated.

In the prior art DF mode, hybrid processing of the relay station subjects the decoded data from the base station and the mobile station to a bit XOR operation to organize into a combination signal to be subsequently encoded for transmission. This requires that the coding modulation modes of the two links from the mobile station to the relay station and from the base station to the relay station be the same. When signal-to-noise ratios of the two links differ not much, this solution is feasible. But due to time variation of the mobile channel, when signal-to-noise ratios of the two links differ relatively greatly, this method will cause certain loss of throughput.

FIG. 4 is a block diagram schematically illustrating a prior art relay system that performs Decoder and Forward (DF). As shown in FIG. 4, the relay system that performs DF mainly includes a base station transmitter 100-1, a mobile station transmitter 101-1, a base station-relay station channel 102, a mobile station-relay station channel 103, a relay station 104, a base station receiver 100-2 and a mobile station receiver 101-2. Data transmitted from the base station transmitter 100-1 and the mobile station transmitter 101-1 reaches the relay station 104 via the channel 101 and the channel 102, with noise being mixed therein en route. As shown in FIG. 4, data from the base station and mixed with noise is represented by A, while data from the mobile station and mixed with noise is represented by B. After the relay station 104 receives the signal A from the base station and the signal B from the mobile station, it combines the received signals into a transmission signal (C) of the relay station, and subsequently respectively forwards the signal to the base station and the mobile station. The base station and the mobile station respectively detect and receive the combination signal from the relay station.

FIG. 5 is a block diagram schematically illustrating data processing at the relay station 104. As shown in FIG. 5, signals from the base station and the mobile station are firstly respectively received (including demodulating and decoding, for instance). The receiving mode of the relay station is not defined in this paper, as it can be either independent receiving (namely respectively receiving the information from the base station and the mobile station at different timings/frequencies, as the mode shown in FIG. 2) or receiving at the same time/in the same frequency (as the mode shown in FIG. 3).

The relay station performs the combination operation after receiving the data. One typical data combination mode is bit XOR, for instance, if the two branches of data received by the relay station are sequenced respectively as $\{a_0, a_1, a_2, a_3, \ldots\}$ and as $\{b_0, b_1, b_2, b_3, \ldots\}$, the operation of the combining device 1040 in FIG. 5 will be $$c_i = a_i \oplus b_i, i = 0, 1, 2, \ldots \quad (1)$$

where $\oplus$ is the symbol of the XOR operation. The combined bits are transmitted after having been recoded and modulated.

At the receiving ends of the base station and the mobile station, since one branch of the combination signals forwarded by the relay station is the local original data (namely locally transmitted signal, for instance as regards the base station, it is the signal A free from noise, and as regards the mobile station, it is the signal B free from noise), another branch of the signal (namely the signal desired to be received) can be recovered by performing XOR operation on the received data and the local original data (hereinafter referred to also as the local reference signal), so as to achieve data forwarding. FIG. 6 illustrates the detection and reception processes of the base station and the mobile station. In comparison with the general receiver system as shown in FIG. 1, a local separating device 201 is added downstream of the decoding unit. The separation operation that corresponds to the XOR combination operation in FIG. 5 is as follows:

$$\hat{a}_i = \hat{c}_i \oplus b_i, i = 0, 1, 2, \ldots \quad (2)$$

where $\hat{c}_i$ is the bit of the received combination information, $\hat{a}_i$ is the bit of the information desired to be received after separation (also referred to as desired information bit), and $b_i$ is the local information bit (reference information bit) and provided by a local signal storing unit 202.

The conventional XOR operation demands that the length of the two bit series be the same, and this requires that their modulation and coding scheme also be the same. However, when signal-to-noise ratios of two links differ relatively greatly, it is possible to determine the modulation and coding scheme only in accordance with the link having inferior signal-to-noise ratio, and this reduces throughput of the system.

Reference documents of the present invention are listed below. These documents are herein incorporated by reference, as if they were described in detail in the Description of the present invention.

1. [Patent Document 1]: Xue Feng, et al., Combining packets in physical layer for two-way relaying (US 080219251 A1)
2. [Patent Document 2]: Liu; Zhixin, et al., Compress-forward Coding with N-PSK Modulation for the Half-duplex Gaussian Relay Channel (US 070217541 A1)
3. [Non-Patent Document 1]: P. Larsson, N. Johansson, K. E. Sunell, "Coded bi-directional relaying", the 5th Scandinavian WS on Wireless Ad-Hoc Networks (AdHoc '05), Stockholm, Sweden, May 2005.
4. [Non-Patent Document 2]: Petar Popovski, et al., "Wireless Network Coding by Amplify-and-Forward for Bi-Directional Traffic Flows," IEEE Communication Letters, Vol. 11, NO. 1, January 2007.
5. [Non-Patent Document 3]: Sachin Katti, et al, "XORs in The Air: Practical Wireless Network Coding," SIGCOMM '06, Sep. 11-15, 2006, Pisa, Italy.

BRIEF SUMMARY OF THE INVENTION

The present invention is proposed in view of the foregoing problems to overcome one or more problems present in the prior art, and to provide at least one advantageous choice.

In order to achieve the above objectives, the present application provides the following aspects of inventions.

According to the first aspect, there is provided a data relay apparatus, which includes a first demodulating unit, for demodulating a modulation signal from a first transmission source, modulation mode of the modulation signal from the first transmission source being a first modulation mode; a second demodulating unit, for demodulating a modulation signal from a second transmission source, modulation mode of the modulation signal from the second transmission source being a second modulation mode higher in modulation order than the first modulation mode; a combination controlling unit, for providing mapping rule necessary for performing signal combination in accordance with the modulation mode of the modulation signal from the first transmission source and the modulation mode of the modulation signal from the second transmission source, the mapping rule being rule as how to map the demodulated modulation signal from the first transmission source together with the demodulated modulation signal from the second transmission source to a constellation of symbols of the second modulation mode; and a data combining unit, for performing data combination on the demodulated modulation signal from the first transmission source and the demodulated modulation signal from the second transmission source in accordance with the mapping rule provided by the combination controlling unit.

Second aspect: the data relay apparatus according to the first aspect, characterized in that the mapping rule is expressed by formulae or expressed by table.

Third aspect: the data relay apparatus according to the first aspect, characterized in that the mapping rule is such a rule that performs a bit XOR operation on all bits of one data symbol of the first modulation mode and partial or all bits of one data symbol of the second modulation mode to obtain the data symbol of the second modulation mode.

Fourth aspect: the data relay apparatus according to the first aspect, characterized in that the modulation signal from the first transmission source and the modulation signal from the second transmission source are coded signals, and that the data relay apparatus further includes a first decoding unit, for decoding the demodulated modulation signal from the first transmission source; a first coding unit, for coding the signal decoded by the first decoding unit; a second decoding unit, for decoding the demodulated modulation signal from the second transmission source; and a second coding unit, for coding the signal decoded by the second decoding unit; wherein the data combining unit combines data from the first coding unit with data from the second coding unit.

According to the fifth aspect, there is provided a communication apparatus, which includes a transmitting unit, for transmitting a modulation signal of a first modulation mode or a modulation signal of a second modulation mode, modulation order of the second modulation mode being higher than modulation order of the first modulation mode; a demodulation separating unit, for receiving combined data of the second modulation mode combined from a first modulation data of the first modulation mode with a second modulation data of the second modulation mode, and demodulating and separating a signal desired to be received from the combined data; and a separation controlling unit, for providing signal inverse mapping rule in accordance with whether the first modulation mode, the second modulation mode and modulation mode of the modulation signal transmitted by the transmitting unit are of the first modulation mode or of the second modulation mode, the inverse mapping rule being a rule of mapping constellation points in a constellation of symbols in the combined data into bits of the modulation mode desired to be received; wherein the demodulation separating unit separates data desired to be received from the combined data in accordance with the inverse mapping rule determined by the separation controlling unit.

Sixth aspect: the communication apparatus according to the fifth aspect, characterized in that the inverse mapping rule is expressed by formulae and expressed by table.

Seventh aspect: the communication apparatus according to the fifth aspect, characterized in that the demodulation separating unit includes a detecting unit, for performing symbol detection on a received signal; a symbol separating unit, for separating constellation points of symbols of the data desired to be received from the combined data in accordance with the inverse mapping rule; and a judging unit, for judging bit values of the constellation points of symbols separated by the symbol separating unit to obtain the data desired to be received.

Eighth aspect: the communication apparatus according to the fifth aspect, characterized in that the communication apparatus further includes a determining unit for determining whether the modulation mode of a combined signal as received is lower than the modulation mode of the modulation signal transmitted by the transmitting unit; and that the demodulation separating unit includes a detecting unit, a judging unit and a symbol separating unit, of which the detecting unit performs symbol detection on a received signal; wherein when the determining unit determines that the modulation mode of the combined signal as received is higher than the modulation mode of the modulation signal transmitted by the transmitting unit, the judging unit judges bit values of the constellation points of symbols detected by the detecting unit, and the symbol separating unit separates the data desired to be received from the combined data in accordance with the inverse mapping rule and the bit values judged by the judging unit; and wherein when the determining unit determines that the modulation mode of the combined signal as received is not higher than the modulation mode of the modulation signal transmitted by the transmitting unit, the symbol separating unit separates the constellation points of symbols of the data desired to be received from the combined data in accordance with the inverse mapping rule, and the judging unit judges bit values of the constellation points of symbols separated by the symbol separating unit to obtain the data desired to be received.

Ninth aspect: the communication apparatus according to the fifth aspect, characterized in that the inverse mapping rule is determined by maximum criterion of minimum Euclidean distance, or determined by maximum criterion of minimum Euclidean distance and criterion of minimum number of symbol pairs of minimum Euclidean distance.

According to the tenth aspect, there is provided a communication method, which includes the following steps of: transmitting a modulation signal of a first modulation mode or a modulation signal of a second modulation mode, modulation order of the second modulation mode being higher than modulation order of the first modulation mode; receiving combined data of the second modulation mode combined from a first modulation data of the first modulation mode with a second modulation data of the second modulation mode; providing signal inverse mapping rule in accordance with whether the first modulation mode, the second modulation mode and the modulation mode of the modulation signal transmitted in the transmitting are of the first modulation mode or of the second modulation mode, the inverse mapping rule being a rule of mapping constellation points in a constellation of symbols in the combined data into bits of the modulation mode desired to be received; and separating data desired to be received from the combined data in accordance with the inverse mapping rule determined in the providing.

According to the eleventh aspect, there is provided a data relay method, which includes the following steps of: demodulating a modulation signal from a first transmission source, modulation mode of the modulation signal from the first transmission source being a first modulation mode; demodulating a modulation signal from a second transmission source, modulation mode of the modulation signal from the second transmission source being a second modulation mode higher in modulation order than the first modulation mode; providing mapping rule necessary for performing signal combination in accordance with the modulation mode of the modulation signal from the first transmission source and the modulation mode of the modulation signal from the second transmission source, the mapping rule being rule as how to map the demodulated modulation signal from the first transmission source together with the demodulated modulation signal from the second transmission source to a constellation of symbols of the second modulation mode; and performing data combination on the demodulated modulation signal from the first transmission source and the demodulated modulation signal from the second transmission source in accordance with the mapping rule provided in the providing.

Twelfth aspect: the data relay method according to the eleventh aspect, characterized in that the mapping rule is expressed by formulae or expressed by table.

Thirteenth aspect: the data relay method according to the eleventh aspect, characterized in that the first modulation mode is QPSK modulation, the second modulation mode is 16QAM, and the mapping rule is $$\{c_0,c_1,c_2,c_3\}=\{a_0 \oplus b_0, a_1 \oplus b_1, a_0 \oplus b_2, a_1 \oplus b_3\}.$$

The present invention further provides a computer readable program, when executed by a computer or another logical device, capable of realizing various methods or certain steps in the various methods as described above and below. The computer or logical device is, for example, a personal computer, a PDA, a cell phone, a smart telephone, etc.

The present invention still further provides a computer readable medium storing thereon the aforementioned computer readable program. The readable medium is, for example, a CD, a DVD, a flash, a magnetic disk, a magnetic tape, a hard disk drive, an ROM, etc.

According to the embodiments of the present invention, it is possible to perform combination transmission and decoding separation on two branches of modulation symbols from different modulation modes, thus making it possible for the data transmission rates of the two links to adaptively vary according to signal-to-noise ratios, and thereby enhancing throughput of the system. The method and apparatus according to the present invention can be used in a relay forwarding system, or in a communications system in the case it is needed to combine and separate signals.

BRIEF DESCRIPTION OF THE DRAWINGS

The drawings illustrate preferred embodiments of the present invention, and constitute part of the Specification to further enunciate the principles of the present invention in greater detail together with the literal explanations. In the drawings.

DETAILED DESCRIPTION OF THE INVENTION

Specific embodiments of the present invention are described in greater detail below with reference to the accompanying drawings.

Embodiments of the present invention take considerations of circumstance that link condition between the relay station and the base station is different from the link condition between the relay station and the mobile station. According to the present invention, it is possible to select respective proper modulation and coding scheme according to the actual circumstance of each link connected to the relay station; in other words, the modulation and coding scheme of each link can be different from those of others to thereby enhance throughput of the system.

The modulation and coding scheme (MCS) of the transmitter in the communications system is determined and selected according to the result of channel estimate. The signal-to-noise ratio (SNR) of the link is learned by estimating a training sequence or pilot to obtain the result of channel estimate, and the proper modulation and coding scheme is then selected according to certain requirement of the packet error rate (for instance, it is required that the packet error rate be 0.1). Since combinations of different modulation and coding schemes have different packet error rates when their signal-to-noise ratios are different, the transmitting end will select the combination of MCS having the maximum throughput in the condition of satisfying the requirement of the packet error rate. The MCS format of the transmitter is usually notified to the receiving end at the signaling section. The signaling can be transmitted to the receiving end via a dedicated frequency band or via the first several units of the data packet in agreed format.

In the present invention, the same modulation and coding scheme is employed when the signal-to-noise ratios of the two links from the base station to the relay station and from the mobile station to the relay station differ not much. But when the channels of the two links differ relatively greatly (for instance, when their signal-to-noise ratios differ relatively greatly), the two links may employ different modulation and coding schemes (MCS) to make full use of the channel resource. In this paper, the modulation scheme employed in the two links which is in higher order is called the higher order modulation, and the signal modulated by the higher order modulation is called the higher order modulation signal. The modulation employed in the two links which is in lower order is called the lower order modulation, and the signal modulated by the lower order modulation is called the lower order modulation signal.

Presented below is the processing of the received two branches of data by the relay station according to the embodiment of the present invention when the two links of the base station-relay station and the mobile station-relay station employ different modulation and coding schemes.

Figure 8:
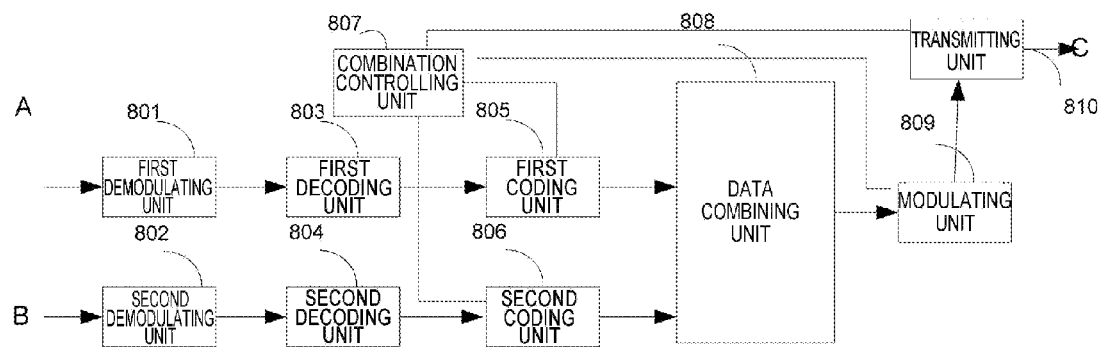
FIG. 8 is a block diagram schematically illustrating the function of the relay station according to the first embodiment of the present invention.

FIG. 8 is a functional block diagram schematically illustrating the relay station according to the first embodiment of the present invention. As shown in FIG. 8, the relay station according to the first embodiment of the present invention includes a first demodulating unit 801, a second demodulating unit 802, a first decoding unit 803, a second decoding unit 804, a first coding unit 805, a second coding unit 806, a combination controlling unit 807, a data combining unit 808, a modulating unit 809, and a transmitting unit 810.

In the relay station according to the present invention, the first demodulating unit 801 and the first decoding unit 803 firstly demodulate and decode the signal (for instance, the signal A containing noise) from the base station. On the other hand, the second demodulating unit 802 and the second decoding unit 804 demodulate and decode the signal (for instance, the signal B containing noise) from the mobile station.

The combination controlling unit 807 determines the coding and modulation scheme that should be employed, determines the mapping rule, namely the rule for mapping bits to symbols, and in other words, how the bits are mapped and combined to become symbols. In an alternative embodiment, the combination controlling unit 807 further determines the coding mode, and instructs the determined coding mode that should be employed to the first coding unit 805, the second coding unit 806 and the transmitting unit 810. Specifically, the combination controlling unit 807 compares the data modulation mode from the base station with the data modulation mode from the mobile station, and obtains the coding and modulation scheme having higher modulation order to serve as the coding and modulation scheme that should be employed. The increasing sequence of the modulation order can for instance be: BPSK→QPSK→16QAM→64QAM. On the other hand, the combination controlling unit 807 can determine the coding and modulation scheme that should be employed by using a method of lookup table in accordance with the data modulation mode of the data from the base station and the data modulation mode of the data from the mobile station. Under such a circumstance, the table used in the method of lookup table includes three fields for instance, with one field corresponding to the data coding and modulation scheme of data from the base station, one field corresponding to the data coding and modulation scheme of the data from the mobile station, and one field corresponding to the coding and modulation scheme that should be employed.

The first coding unit 805 codes the data decoded by the first decoding unit 803 according to the coding mode determined by the combination controlling unit 807, and sends the coded data to the data combining unit 808. The second coding unit 806 codes the data decoded by the second decoding unit 804 according to the coding mode determined by the combination controlling unit 807, and sends the coded data to the data combining unit 808.

The data combining unit 808 combines the data from the first coding unit 805 with the data from the second coding unit 806 according to the mapping rule from the combination controlling unit 807, and transmits the combined data to the modulating unit 809. When the modulation and coding scheme of the two branches of data are the same, the mapping rule from the combination controlling unit 807 is the same as that of the prior art, and the data combining unit 808 may also employ the same data combining method as that in the prior art, so that no detailed explanation is made here. When the modulation and coding schemes of the two branches of data are different, the mapping rule from the combination controlling unit 807 is different from that in the prior art, and the operation of the data combining unit 808 is also correspondingly different from that in the prior art. These will be explained in greater detail below.

The modulating unit 809 modulates the combined data from the data combining unit 808 according to the modulation mode determined by the combination controlling unit 807, and sends the modulated data to the transmitting unit 810. The transmitting unit 810 transmits the data from the modulating unit 809, and transmits the coding and modulation scheme given by the combination controlling unit 807.

As should be pointed out, in the above explanations, the first coding unit 805 and the second coding unit 806 in FIG. 8 may use the same coding mode as that of the original data, and may also use a new coding mode. When the original MCS is used, the relay station recodes the received data, with the format being the same as that of the original data, then combines the data, and then modulates the combined data. At this time, as for the reception of the relayed combination data, since the modulation and coding scheme of the local signal is known to the receiving ends of the base station and the mobile station and the desired signal is only separated from the combination signals, it suffices for the relay station to notify the two receiving ends of the modulation and coding scheme of the combination signals at the signaling section. If the relay station employs a new modulation and coding scheme in the received two branches or one branch thereof in accordance with the channel quality, the changed modulation and coding scheme should be notified to the two receiving ends, and this is also notified at the signaling section. Under such circumstance, the receiving ends will learn the two modulation and coding schemes of the two branches of data through the signaling section, and obtain the local signal by performing modulation and coding twice on the local data (namely the forwarded local data) during recovery and separation operations of the data. For instance, the data modulation and coding scheme of the link between base station and relay station link is MCS1, the modulation and coding scheme of the link between the mobile station and the base station is MCS2, while the relay station changes the modulation and coding schemes of the two branches of data respectively as MCS3 (for data from the base station) and MCS4 (for data from the mobile station) after reception. After the modulation and coding schemes are changed, the mapping rule and data combination are performed in accordance with the new schemes (namely combining the modulation data of MCS3 and MCS4). As for the receiving end of the mobile station, when the combined data is received, the local reference signal is the coded and modulated reference signal that is generated according to MCS4 base on the local original bit data, and separation and reception of the combined data is performed by data decoding and demodulating according to MCS3.

The specific circumstance for combination using the original MCS is firstly given. If the base station-relay station link employs the 16QAM-½ mode, while the relay station-mobile station link employs the QPSK-½ mode which is in lower modulation order, after the relay station receives the data, the coding mode of the input signal is not changed for the first coding unit 805 and the second coding unit 806. That is to say, the second coding unit 806 in FIG. 8 codes by a reverse process as the second decoding unit 804 decodes, and the first coding unit 805 also codes by a reverse process as the first decoding unit 803 decodes.

When the relay station changes the MCS of the already received data according to the actual channel quality requirement, for instance, if the link between base station and relay station employs the 16QAM-½ coding mode, whereas the link between relay station and mobile station employs the QPSK-½ mode, after the relay station receives the data, the original QPSK-½ mode may not be employed but changed to QPSK-¾ mode for the second coding unit 806. At this time, the second coding unit 806 changes to ¾ coding (that is to say, the process at the second coding unit 806 is not directed to the reverse process with regard to the second decoding unit 804).

As should be noted, the first coding unit 805 and the second coding unit 806 according to the present invention can always employ the same coding mode as the original data, in which case the combination controlling unit 807 can merely determine the modulation mode.

The coded data is sent to the data combining unit 808 for combination and subsequent processing.

When the relay station performs data combination on different MCS data, the numbers of symbols of the combined data of the two links should be equal. If the numbers of symbols of the two links are not equal, it is possible to store in the relay station partial data of the link having greater data traffic for combination and forwarding operations with the next frame of data of the link having lower data traffic. In other words, equalization of the numbers of symbols can be realized in the relay station, so that it is supposed in the following paragraphs that the numbers of symbols of the data to be combined in the two links are equal.

The combination operation of the two branches of differently modulated data takes the modulation symbols as basic unit. The combined data then enters the modulating unit 809 for modulation, and is then forwarded by the relay station to the base station and the mobile station. The modulation mode of the combined data employs the higher modulation order from the two branches of signals. For instance, as previously mentioned, the increasing sequence of a modulation order is BPSK→QPSK→16QAM→64QAM.

The data combining unit 808 performs data combination according to the mapping rule provided by the combination controlling unit 807. The mapping rule is for instance expressed by formulae or realized by XOR operation, and may also be not expressible by formulae, in which case the mapping rule may for instance be presented in the form of a table, which will be explained below. Explanation is made now under the circumstance the mapping rule provided by the combination controlling unit 807 is realized by XOR operation, and the process thereof is described as follows. Suppose the modulation mode of one link is QPSK (corresponding to the first modulation mode) and the modulation mode of another link is 16QAM (corresponding to the second modulation mode), the bit sequences to which one modulation symbol according to these modulation mode corresponds are respectively $\{a_0,a_1\}$ and $\{b_0,b_1,b_2,b_3\}$. The modulation after combination will employ the 16QAM mode, and the following several XOR modes can be employed at the data combining unit 808:

$$\{c_0,c_1,c_2,c_3\}=\{a_0\oplus b_0,b_1,a_1\oplus b_2,b_3\} \quad (3)$$

$$\{c_0,c_1,c_2,c_3\}=\{b_0,a_0\oplus b_1,b_2,a_1\oplus b_3\} \quad (4)$$

$$\{c_0,c_1,c_2,c_3\}=\{a_0\oplus b_0,a_1\oplus b_1,a_0\oplus b_2,a_1\oplus b_3\} \quad (5)$$

$$\{c_0,c_1,c_2,c_3\}=\{a_0\oplus b_0,a_0\oplus b_1,a_1\oplus b_2,a_1\oplus b_3\} \quad (6)$$

The combination data $\{c_0,c_1,c_2,c_3\}$ obtained by formulae (3) to (6) is a 16QAM constellation.

This combination mode is also applicable to other modulation data, for instance, as regards the combination of BPSK and QAM modulations, the data format after combination is as shown in Table 1. The principle for other modulation modes such as 8PSK that is not listed in Table 1 is the same as that in Table 1, that is, all bits of one data symbol modulated in low order and partial or all bits of one data symbol modulated in high order are performed with the bit XOR operation to obtain one symbol modulated in high order.

As should be pointed out, in the above description the combination controlling unit 807 determines the modulation mode that should be employed to determine the mapping rule according to the modulation modes of two branches of signals.

As should be pointed out, bit XOR is but only one mode of realizing the mapping rule, as it is also possible to use other modes to perform data combination of different modulation modes, for instance, by the modes of other bit operations.

TABLE 1

Data Combination Results of Different Modulation Modes

| MCS2 | MCS1 | | | |
|---|---|---|---|---|
| | BPSK | 4QAM/QPSK | 16 QAM | 64 QAM |
| BPSK | BPSK | 4QAM | 16 QAM | 64 QAM |
| 4QAM/QPSK | 4QAM | 4QAM | 16 QAM | 64 QAM |
| 16 QAM | 16 QAM | 16 QAM | 16 QAM | 64 QAM |
| 64 QAM | 64 QAM | 64 QAM | 64 QAM | 64 QAM |

The data obtained by the data combining unit is referred to as the combination data, and the symbol of the combination data is referred to as the combination symbol. As can be seen, the method according to this paper performs operation with one modulated data symbol as unit.

Figure 1:
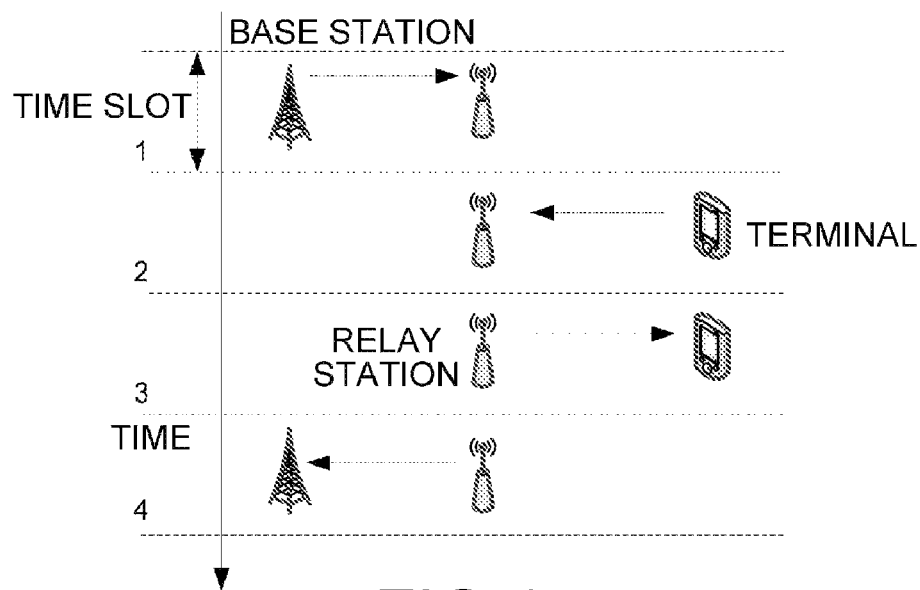
FIG. 1 illustrates the classical relay forwarding system of four time slots.
Figure 2:
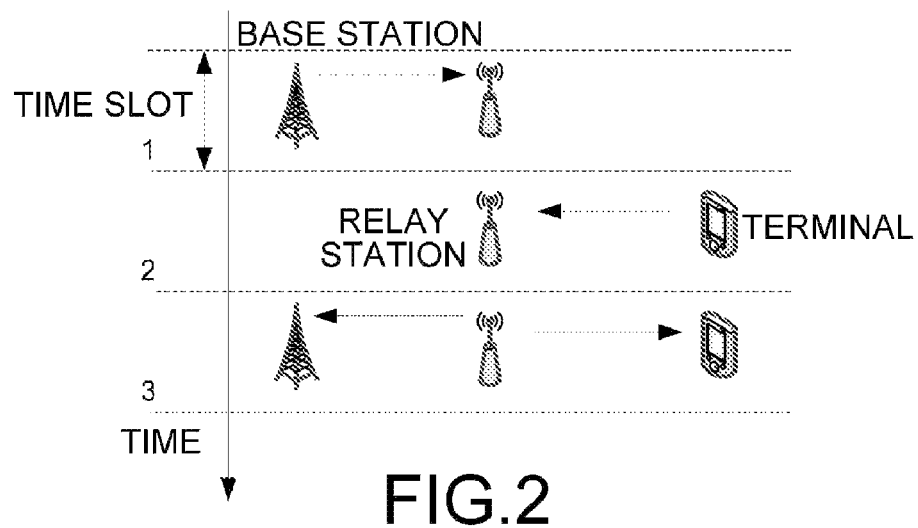
FIG. 2 illustrates the relay forwarding system that receives signals respectively but transmits signals in combination by three time slots.
Figure 3:
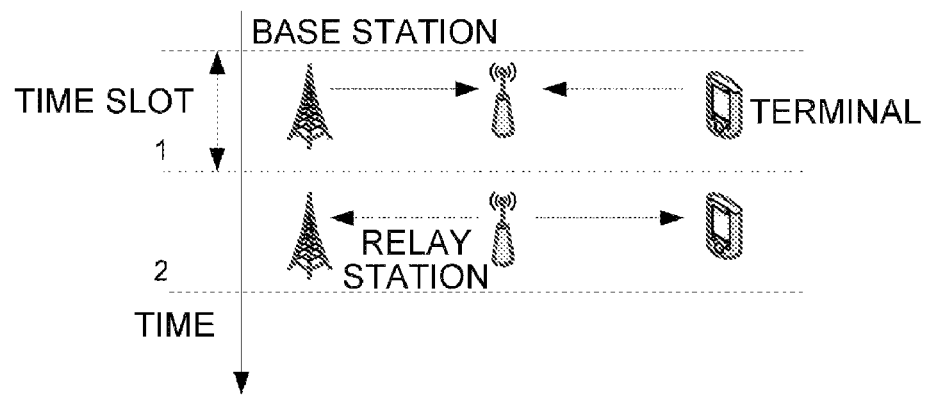
FIG. 3 illustrates a relay system that receives signal simultaneously and forwards signal in combination by two time slots.
Figure 4:
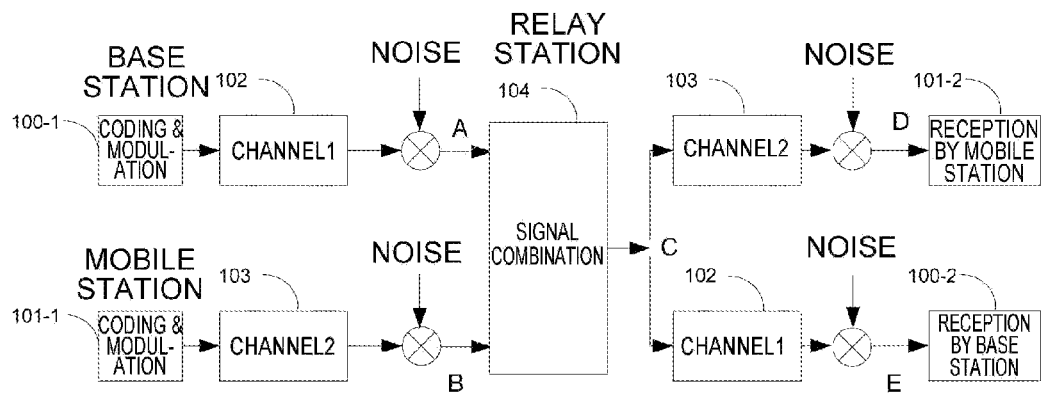
FIG. 4 is a block diagram schematically illustrating the relay system that decodes and forwards according to conventional technology.
Figure 5:
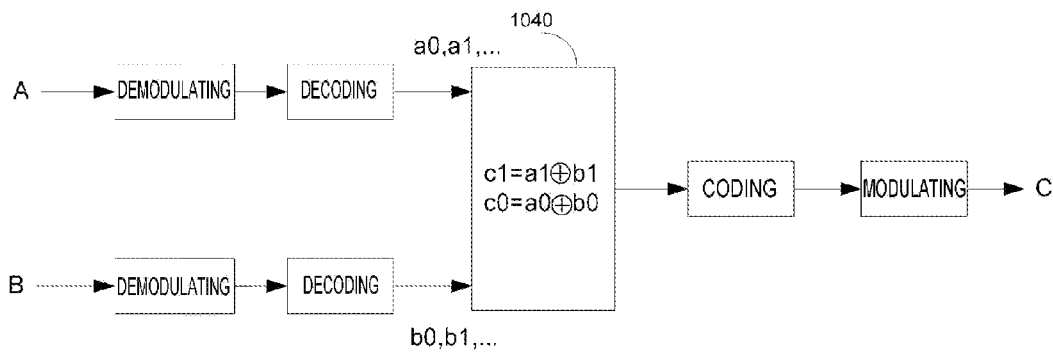
FIG. 5 is a block diagram schematically illustrating data processing at the relay station according to conventional technology.
Figure 6:
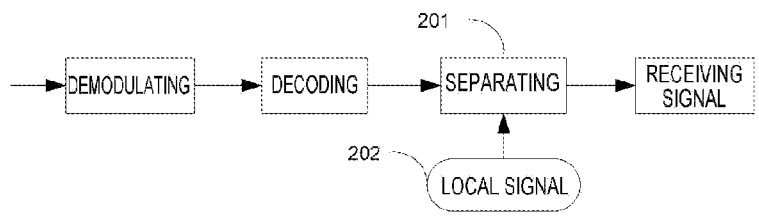
FIG. 6 illustrates detection and reception processes of the base station and the mobile station.
Figure 7:
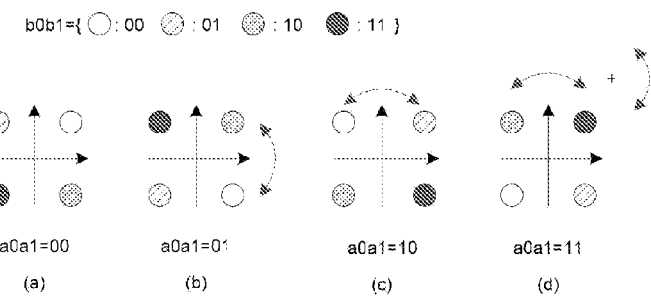
FIG. 7 is a view illustrating variation of the constellation caused by XOR of two QPSK symbols.

Data combination actually changes the mapping rule of the modulation data from data bits to modulation symbol constellation points. To facilitate explanation, the variation of the constellation caused by the combination of identical modulation signals is firstly explained. FIG. 7 illustrates variation of the constellation caused by XOR of two QPSK symbols. As shown in FIG. 7, the bit sequences of the two QPSK symbols on which XOR is performed are $\{a_0,a_1\}$ and $\{b_0,b_1\}$. When $\{a_0,a_1\}=\{0,0\}$, the XOR result of formula (1) is as shown in FIG. 7(*a*), at which time $\{b_0,b_1\}$ is the standard Gray QPSK mapping. When $\{a_0,a_1\}=\{0,1\},\{1,0\},\{1,1\}$, the corresponding constellations after XOR are as shown in FIGS. 7(*b*), 7(*c*) and 7(*d*), respectively. In FIG. 7(*a*), the modulation symbol corresponding to the bit sequence $\{b_0,b_1\}=\{0,0\}$ is the white circle at the upper right corner, while the corresponding mapping position in FIG. 7(*b*) is changed to the lower right corner.

If $\{b_0,b_1\}$ is set as the local reference data, then for the different bit sequence $\{a_0,a_1\}$, the bit XOR operation is equivalent to remapping the standard QPSK constellation point position and the corresponding bits. For instance, position is changed from up to down as regards FIG. 7(*b*) to FIG. 7(*a*), position is changed from left to right as regards FIG. 7(*c*) to FIG. 7(*a*), while position is changed diagonally or from up to down plus from left to right as regards FIG. 7(*d*) to FIG. 7(*a*). Correspondingly, at the receiving end, the process of reverse XOR operation to separate the desired signal is the reverse process to the remapping. Taking FIG. 7 for example, detection and reception of the $\{b_0,b_1\}$ signal are to use different de-mapping constellations in accordance with different local reference signals $\{a_0,a_1\}$, for instance, FIG. 7(*a*) is used to demodulate and judge when $\{a_0,a_1\}=\{0,0\}$.

As can be seen from FIG. 7, insofar as the QAM modulation whose constellation is relatively simple is concerned, the combination operation of bit XOR is equivalent to remapping the constellation points of the standard QAM modulation, and what is changed is only the mapping rule.

Figure 10:
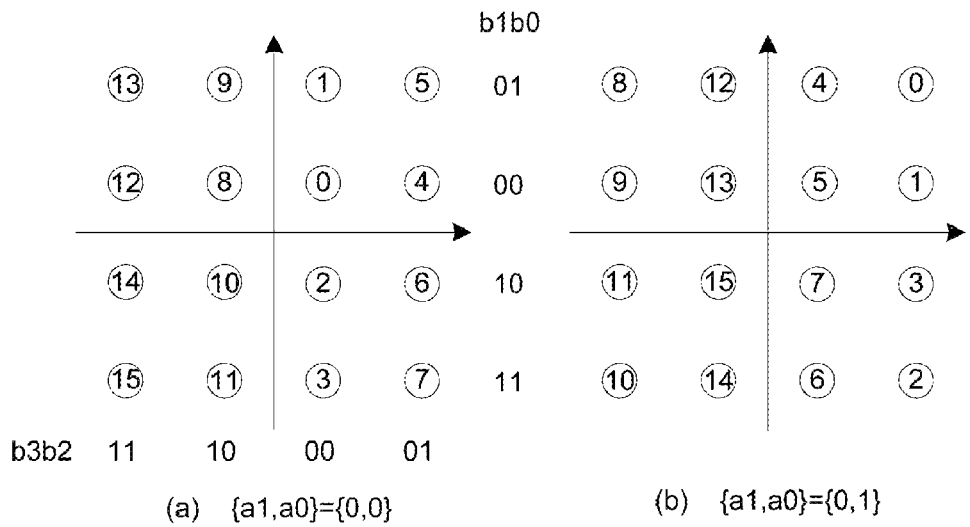
FIG. 10 illustrates the mapping figure of the 16QAM constellation during combination of QPSK-16QAM.
Figure 10:
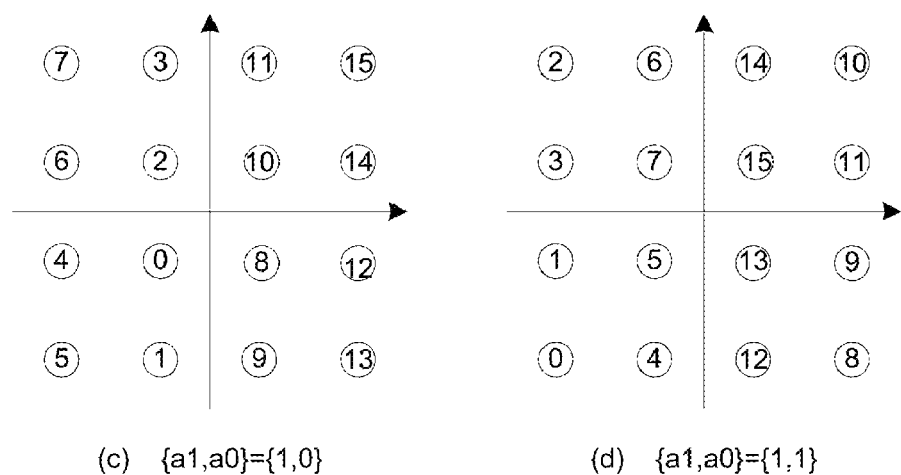

FIG. 10 illustrates variation of the constellation of the 16QAM symbol caused by combination of QPSK symbol and 16QAM symbol.

As shown in FIG. 10 for instance, FIG. 10(a) is directed to a standard 16QAM Gray mapping, and FIG. 10(b) is directed to a changed mapping, in which the digit of each constellation point represents a corresponding bit sequence, with 0-15 respectively corresponding to {0,0,0,0}-{1,1,1,1} on a one-to-one basis. As can be seen, in FIG. 10(b) the corresponding mapping positions of the modulation constellation symbols and the bit sequences are changed. The combination controlling unit 807 determines the mapping rule according to the modulation modes of the two branches of signals to be combined, and provides the mapping rule to the data combining unit 808. The mapping rule can be predetermined according to the modulation modes of the two branches of signals to be combined.

Presented below is the processing at the receiving end with reference to FIG. 9.

After the receiving ends of the two links receive the combination data transmitted from the relay station, the local original data is removed from the combination data to obtain the data that should be received, in accordance with a copy of the already transmitted data sequence locally stored. The MCS formats of the forwarded combination signal and local signal are known to the receiving terminals (the base station and the mobile station) of the relay system.

As for the combination data (combination data modulated in high order, namely the modulation order of the data of the communicating party to be received is higher than that of the local) whose modulation order is higher than the modulation order of the local signal and the combination data (combination data modulated in low order, namely the modulation order of the data of the communicating party to be received is lower than that of the local) whose modulation order is not higher than the modulation order of the local signal, the reception and separation of the combination data can either be not identical or identical.

The statistic characteristic and average power of the combination data modulated in high order are not changed because only the corresponding position from the bit to the constellation point of the symbol is changed, so that the receiving performance is the same as the performance of an equivalent modulation receiver of a general communications system on which no combination and separation operations are performed. Whereas with regard to a combination signal modulated in low order, since the combined data is changed with such parameters as the distance between symbols and the average power, the performance is also changed; the specific mapping chart thereof can be seen from FIG. 11, and will be described later. Accordingly, separation of the combination data can be different for the combination data modulated in high order and the combination data modulated in low order.

Figure 9:
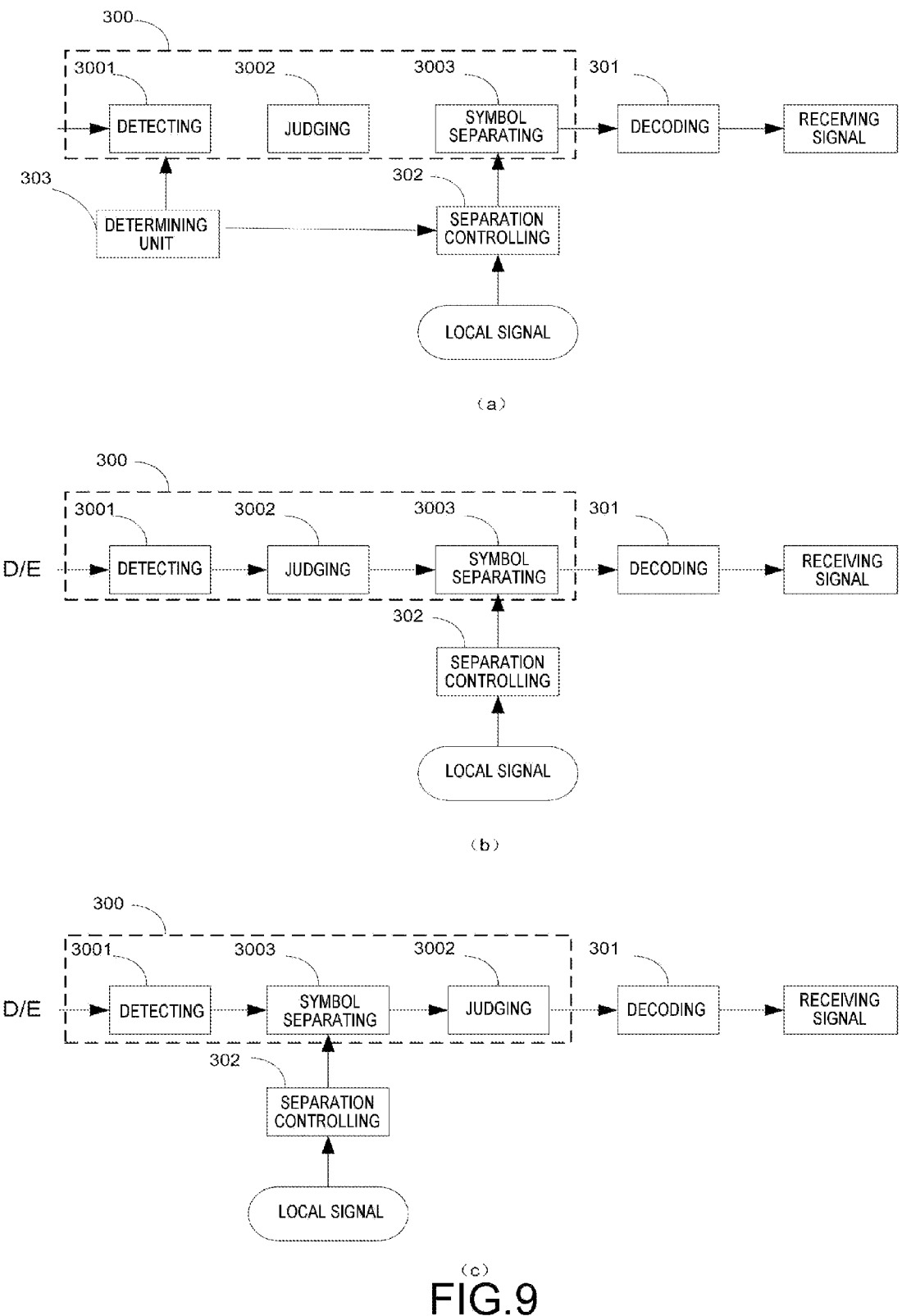
FIG. 9 is a block diagram illustrating the data separating device according to one embodiment of the present invention.

FIG. 9 is a block diagram illustrating the data separating device according to one embodiment of the present invention. The data separating device in this embodiment employs different receiving and processing modes for the combination data modulated in high order and the combination data modulated in low order.

As shown in FIG. 9(a), the data separating device includes a demodulation separating unit 300, a decoding unit 301, a separation controlling unit 302 and a determining unit 303. The decoding unit 301 can be the same as that in a conventional communications system. The demodulation separating unit 300 obtains the data from the communicating party from the received signal. Specifically, the demodulation separating unit 300 realizes the functions of demodulation and extracting the data sent by the communicating party from the received signal. The demodulation separating unit 300 includes a detecting unit 3001, a judging unit 3002 and a symbol separating unit 3003. The determining unit 303 determines whether the received signal is a combination signal modulated in high order or a combination signal modulated in low order. The separation controlling unit 302 determines the mapping rule that should be employed by the symbol separating unit to perform the separation operation. The demodulation separating unit 300 is described in greater detail below.

Upon reception of the combination signal from the relay station, the determining unit 303 determines whether the received signal is a combination signal modulated in high order or a combination signal modulated in low order. For instance, the determining unit 303 compares the modulation mode of the received combination signal with the modulation mode of the transmitted local signal, determines the received signal as a combination signal modulated in high order when the modulation mode of the received combination signal is higher than or equal to the modulation mode of the local signal, otherwise determines the received combination signal as a combination signal modulated in low order. If the determining unit 303 determines the received signal as a combination signal modulated in high order, the relationship among the internal modules of the demodulation separating unit 300 and the relationship between the demodulation separating unit 300 and the separation controlling unit 302 are as shown in FIG. 9(b). On the other hand, if the determining unit 303 determines the received signal as a combination signal modulated in low order, the relationship among the internal modules of the demodulation separating unit 300 and the relationship between the demodulation separating unit 300 and the separation controlling unit 302 are as shown in FIG. 9(c). Further explanation is made below with reference to FIGS. 9(b) and 9(c).

Figure 12:
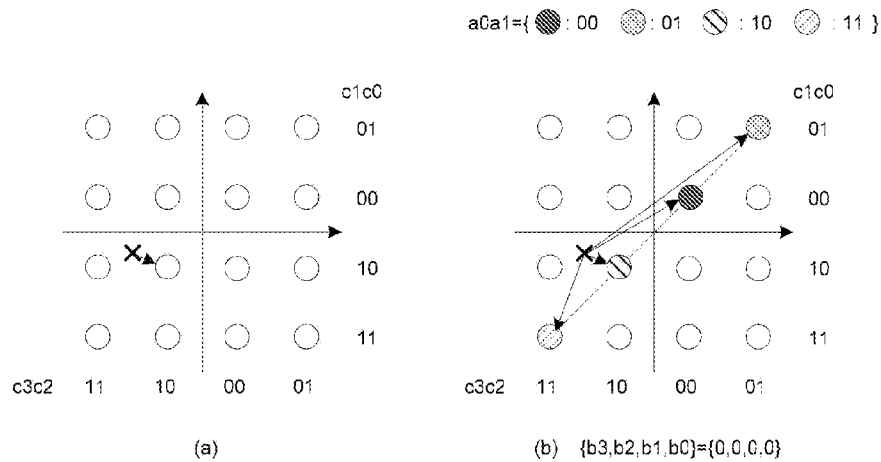
FIG. 12 is a view schematically illustrating the judging principle of the QAM constellation.

Reception of the combination data modulated in high order is firstly described below with reference to FIG. 9(b). The detecting unit 3001 performs symbol detection on the received signal, and outputs the detected symbols to the judging unit 3002. The detection and judging are completely the same as the functions of the demodulating unit of the general communications system. Like the method of the general communications system, the judging unit 3002 employs the two modes of hard judging and soft judging. The result of hard judging is an integer equal to 0/1, and directly corresponds to one bit. For example, the detecting result is a complex number with noise, such as shown by the "x" in FIG. 12(a). During hard judging the judging device directly takes the bit sequence corresponding to the modulation constellation point closest to the detecting result as the output. As shown in FIG. 12(a), the hard judging result of the judging device is {1,0,1,0}. Whereas the soft judging result is a probability value indicating that the bit is equal to 1 or 0, and this numerical value is a real number; as for the 16QAM modulation shown in FIG. 12(a), the output from the judging device is {$L_3, L_2, L_1, L_0$}.

The separation controlling unit 302 determines the reverse mapping rule according to the modulation mode of the local signal and the modulation mode of the signal of the communicating party as determined by signaling; that is to say, it determines a mapping rule from the symbols to the bits, and in other words. it determines how to map and separate the symbols into bits. The symbol separating unit 3003 performs separation operation on the output from the judging device 3002 in accordance with the reverse mapping rule provided by the separation controlling unit. In the symbol separating unit 3003, the separation operation for the combination data modulated in high order is equivalent to remapping the bits-constellation points on the constellation.

Specifically, as regards the bit integral value output of the hard judging by the judging device 3002, for instance for the concrete examples of combination in formulae (3)-(6), when the local signal is $\{a_0, a_1\}$, the separation of the corresponding data modulated in high order (16QAM) can be realized by formulae, and the corresponding bit separation operations of the symbol separating unit 3003 can be respectively expressed as:

$$\{\hat{b}_0, \hat{b}_1, \hat{b}_2, \hat{b}_3\} = \{a_0 \oplus c_0, c_1, a_1 \oplus c_2, c_3\} \quad (7)$$

$$\{\hat{b}_0, \hat{b}_1, \hat{b}_2, \hat{b}_3\} = \{c_0, a_0 \oplus c_1, c_2, a_1 \oplus c_3\} \quad (8)$$

$$\{\hat{b}_0, \hat{b}_1, \hat{b}_2, \hat{b}_3\} = \{a_0 \oplus c_0, a_1 \oplus c_1, a_0 \oplus c_2, a_1 \oplus c_3\} \quad (9)$$

$$\{\hat{b}_0, \hat{b}_1, \hat{b}_2, \hat{b}_3\} = \{a_0 \oplus c_0, a_0 \oplus c_1, a_1 \oplus c_2, a_1 \oplus c_3\} \quad (10)$$

where $c_i$, i=0, 1, 2, 3 is the combination information bit output from the judging device 3002, $\hat{b}_i$, i=0, 1, 2, 3 is the desired information bit after separation (like the expression of the general communications system, the received data $\{\hat{b}_i\}$ is added with a triangle to differentiate from the source data sequence $\{b_i\}$), and $a_i$, i=0, 1 is the local reference bit.

If the output from the judging unit 3002 in FIG. 9(b) is soft bit information (with one bit corresponding to one real number value), the reverse separation operation to the XOR operation is equivalent to maintaining the soft information numerical value or equivalent to a negating operation. For instance, suppose the bit soft judging output of the 16QAM symbols at this time is $\{L_{c0}, L_{c1}, L_{c2}, L_{c3}\}$, and the local reference signal is $\{a_0, a_1\}$, the reverse separation operations of the separating unit 3003 corresponding to formulae (3) to (6) become as follows:

$$\{L_{b0}, L_{b1}, L_{b2}, L_{b3}\} = \{\text{sgn}(a_0) \cdot L_{c0}, L_{c1}, \text{sgn}(a_1) \cdot L_{c2}, L_{c3}\} \quad (11)$$

$$\{L_{b0}, L_{b1}, L_{b2}, L_{b3}\} = \{L_{c0}, \text{sgn}(a_0) \cdot L_{c1}, L_{c2}, \text{sgn}(a_1) \cdot L_{c3}\} \quad (12)$$

$$\{L_{b0}, L_{b1}, L_{b2}, L_{b3}\} = \{\text{sgn}(a_0) \cdot L_{c0}, \text{sgn}(a_1) \cdot L_{c1}, \text{sgn}(a_0) \cdot L_{c2}, \text{sgn}(a_1) \cdot L_{c3}\} \quad (13)$$

$$\{L_{b0}, L_{b1}, L_{b2}, L_{b3}\} = \{\text{sgn}(a_0) \cdot L_{c0}, \text{sgn}(a_0) \cdot L_{c1}, \text{sgn}(a_1) \cdot L_{c2}, \text{sgn}(a_1) \cdot L_{c3}\} \quad (14)$$

where $L_{ci}$, i=0, 1, 2, 3 is the bit soft information numerical value output from the judging device 3002, $L_{bi}$, i=0, 1, 2, 3 is the desired information bit soft information numerical value after separation, $a_i$, i=0, 1 is the local reference bit, and $\text{sgn}(a_i)$ are positive and negative symbol functions of $a_i$, and expressed as:

$$\text{sgn}(a) = \begin{cases} 1 & a = 0 \\ -1 & a = 1 \end{cases} \quad (15)$$

It is for $\text{sgn}(a_i)$ to decide whether it is necessary to perform the negating operation on the judged soft information, and with respect to the constellation, it is to decide whether to change the mapping rule from the bits to the constellation points. The separated soft bit information $\{L_{bi}\}$ is sent to the decoder 301 for decoding therein. Soft judging and hard judging differ from each other in the fact that the decoding performance of the soft information is better than the hard judging result, so that many actual decoders employ the soft bit information to decode. The method according to the present invention supports data separation and decoding operations of both hard judging and soft judging.

Reception of the combination data modulated in low order is described below with reference to FIG. 9(c). The block diagram of FIG. 9(c) differs from the block diagram of FIG. 9(b) only in that whether the detected data is firstly separated or firstly judged. In FIG. 9(c) the detected data is firstly performed with the separation operation. As regards the high order modulation data (for instance 16QAM data in the modulation pair of 16QAM-QPSK), separation is equivalent to changing the mapping relationship between the constellation points and bits of the original standard constellation. As shown in FIG. 10, the standard 16QAM Gray mapping is shown in FIG. 10(a), and corresponding bit-constellation point symbol mappings of a changed concrete example, namely according to the bit XOR of formula (5), when the local reference signal $\{a_1, a_0\} = \{0,1\}, \{1,0\}, \{1,1\}$ are respectively shown in FIGS. 10(b), 10(c) and 10(d) (wherein (a) indicates the circumstance in which $\{a_1, a_0\} = \{0,0\}$). At this time, the corresponding separation operation, equivalent to the symbols output for detection, employs a new mapping chart in place of the original standard constellation mapping chart, and is then sent to the judging device for judging therein. The method of the judging device 3003 remains unchanged, as only the constellation mapping chart is changed.

The principle of receiving the combination data modulated in low order in FIG. 9(c) is described below. The combination data modulated in low order is received identically as the combination data modulated in high order is processed, and the difference between the two rests in the fact that the constellation mapping chart provided by the symbol separating unit 3003 is a set of low order constellation points consisting of partial constellation points of the high order modulation constellation. For instance, as regards the combination of 16QAM-QPSK, this paper provides the result of the concrete example of formula (5) in the examples of formulae (3) to (6). FIGS. 11(a)-(q) respectively provide the mapping charts on the 16QAM constellation of the bit sequence $\{c_0, c_1, c_2, c_3\}$ obtained by performing XOR on the four symbols $\{a_0, a_1\} = (\{0,0\}, \{0,1\}, \{1,0\}, \{1,1\})$ of QPSK with the local original data according to formula (5) when the local reference 16QAM symbols $\{b_0, b_1, b_2, b_3\}$ changing from $\{0,0,0,0\}$ to $\{1,1,1,1\}$. The four constellation points with different shadows indicate the mappings of the four constellation points of QPSK on the 16QAM constellation. At this time, the separation controlling unit 302 provides the reverse mapping rule according to the combination of modulation modes. The symbol separating unit 3003 generates the corresponding mapping chart according to the reverse mapping rule, in which mapping can be realized either via a logic circuit or by reading from a memory in the mode of a lookup table. Subsequently, the judging device 3002 judges the data according to the mapping chart. The judging at this time differs from the general judging device only in the change of the mapping mode (chart). A concrete example is given, in which when the local signal is 0000, and the corresponding mapping chart is as shown in FIG. 11(a), the separation and judging processes are as shown in FIG. 12(b). The "x" in FIG. 12(b) represents the 16QAM symbol with noise output from the detecting unit 3001 in FIG. 9(c), and the four shadowed constellation points represent the mappings of the QPSK symbols on the 16QAM constellation (the mapping chart is provided by the symbol separating unit 3003). The judging at this time is performed according to the distance between the four shadowed constellation points and the detection output symbol "x". In the case of FIG. 12(b), the hard judging result is $\{a_0, a_1\} = \{1,0\}$. The soft judging result is the judging and calculating result of the distance between the detection output symbol and the four mapped constellation points. For instance, one method of calculating the soft information is as follows:

$$L_{a0} = \frac{\exp(-d_{11}/\sigma^2) + \exp(-d_{10}/\sigma^2)}{\exp(-d_{01}/\sigma^2) + \exp(-d_{00}/\sigma^2)} \quad (16)$$

$$L_{a1} = \frac{\exp(-d_{01}/\sigma^2) + \exp(-d_{11}/\sigma^2)}{\exp(-d_{10}/\sigma^2) + \exp(-d_{00}/\sigma^2)} \quad (17)$$

where $L_{ai}$, i=0, 1 is the bit soft information numerical value output from the judging device 3002, $d_{ij}$ indicates the Euclidian distance between the constellation whose bit sequence is ij and the detection symbol "x", and $\sigma^2$ is noise power.

Formulae (16) and (17) are directed to a standard soft information calculating method, and there are also other simplified methods to calculate the soft information. The conventional method can be employed as how to detect and judge according to the mapping chart. The judging result of the judging unit 3002 is input to the decoding unit 301 to be decoded thereby.

This mode is to firstly change the mapping mode before judging, and as compared with firstly judging before changing the mapping mode of FIG. 9(b), this is merely a change in the sequence of the processing steps for the data modulated in high order, while the result of the data processing is not changed. Therefore, FIG. 9(c) not only supports reception of the combination data modulated in low order, but also supports reception of the combination data modulated in high order. Accordingly, the present invention provides a receiver in another embodiment, and its exemplary structure is as shown in FIG. 9(c). Since FIG. 9(c) has been explained before, no repetition is made here. As should be noted, however, use of this mode makes it unnecessary to determine whether the received signal is a combination signal modulated in high order, so that the determining unit 303 is not needed.

As should be noted, although it is not shown in the drawings, the communication apparatus (such as the base station or the mobile station) of the present invention further includes a transmitting unit and a storing unit. The transmitting unit transmits the modulation signal, and the modulation signal as transmitted is stored in the storing unit as the local original signal. Realization of these units is known to persons skilled in the art, so that no repetition is made here.

Data Forwarding without Coder

Figure 13:
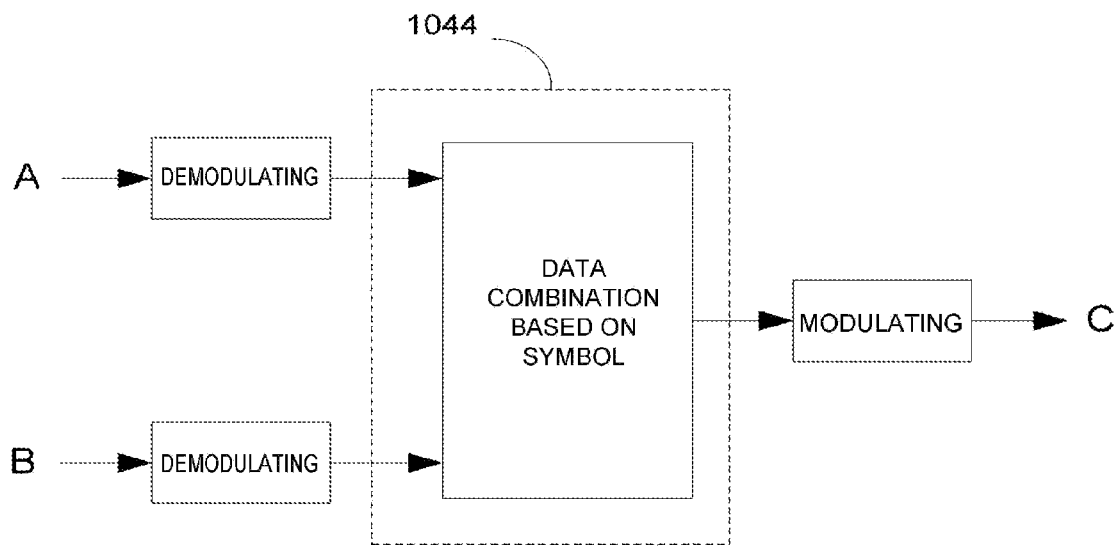
FIG. 13 illustrates combination of symbols of a codeless system in the relay station.

As previously mentioned, data combination and separation operations of the present invention are mainly based on the modulation mode, so that the method is also applicable to the process of relaying and forwarding in the codeless system. As shown in FIG. 13, in the relay station, symbol combination is performed according to a certain mapping rule after the data is demodulated, and then sent out after being modulated again. The block indicated by reference numeral 1044 in FIG. 13 represents the combination controlling unit 807 and the data combining unit 808 in FIG. 8, but the combination controlling unit 807 does not determine the coding mode any more. Since operations of these units have been explained, no repetition is made here.

Figure 14:
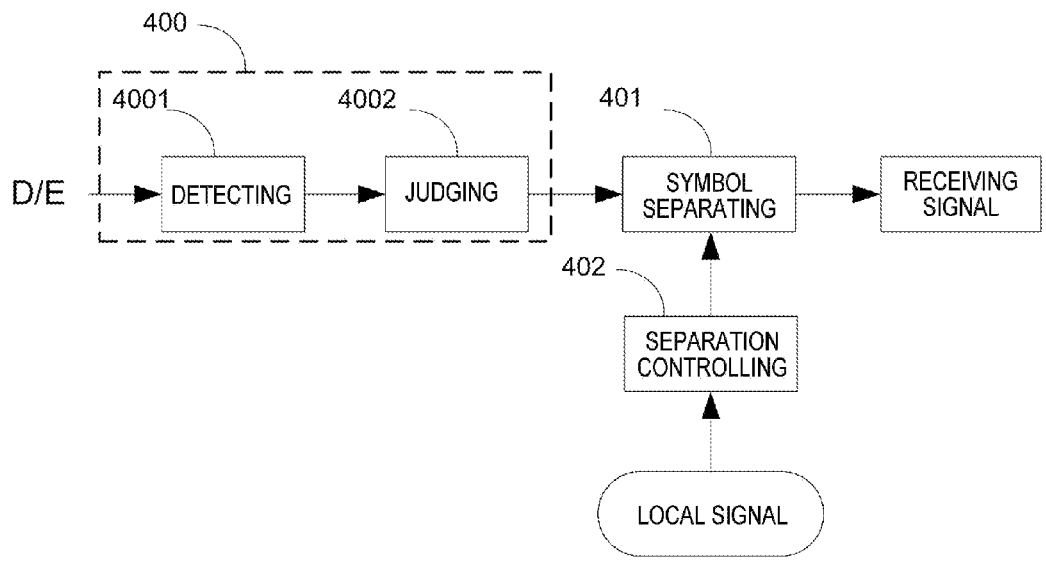
FIG. 14 illustrates the reception and detection processes of the combination data of the colorless system.
Figure 14:
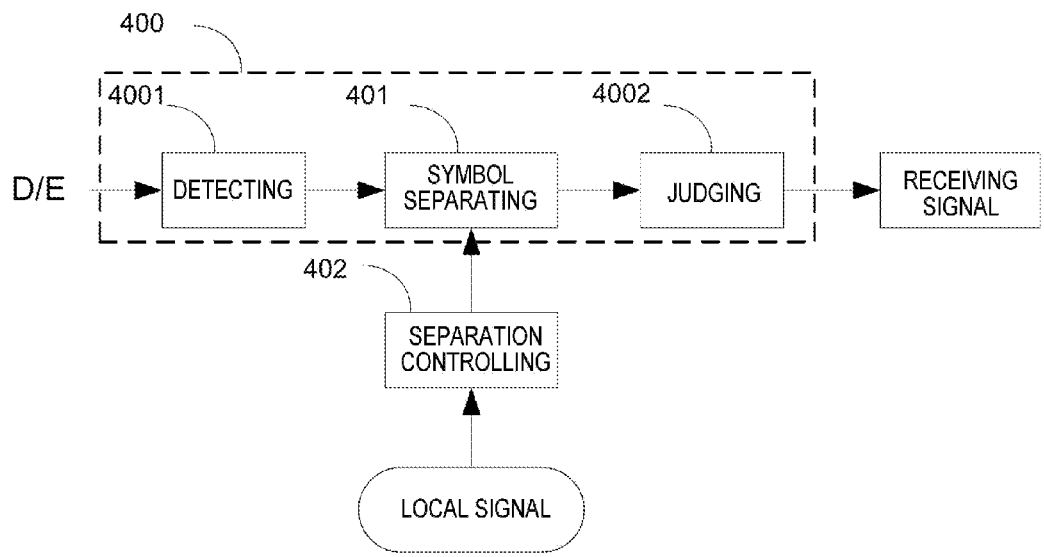

Under the circumstance there is no coder, the symbol separation operation at the receiving end can be as shown in FIG. 14. Like the case in FIGS. 9(b) and 9(c), FIG. 14(a) is suitable for application in the reception of the data modulated in higher order, and it is possible to firstly judge and then separate. However, FIG. 14(b) is a block diagram of a unified receiver, whereby separation is firstly performed according to the mapping chart prior to judging. The data separation operation is also the same as the operation of the component part shown in FIG. 9, with the only difference resting in the absence of the decoding unit.

This is also one embodiment of the present invention.

Mapping Mode

As can be seen from the foregoing data combination and separation processes, data combination is equivalent to a remapping process for different modulation data: for the data modulated in low order, it is to map the constellation points modulated in low order to the constellation points modulated in high order; for the data modulated in high order, it is equivalent to the process of remapping the constellation points.

Figure 11:
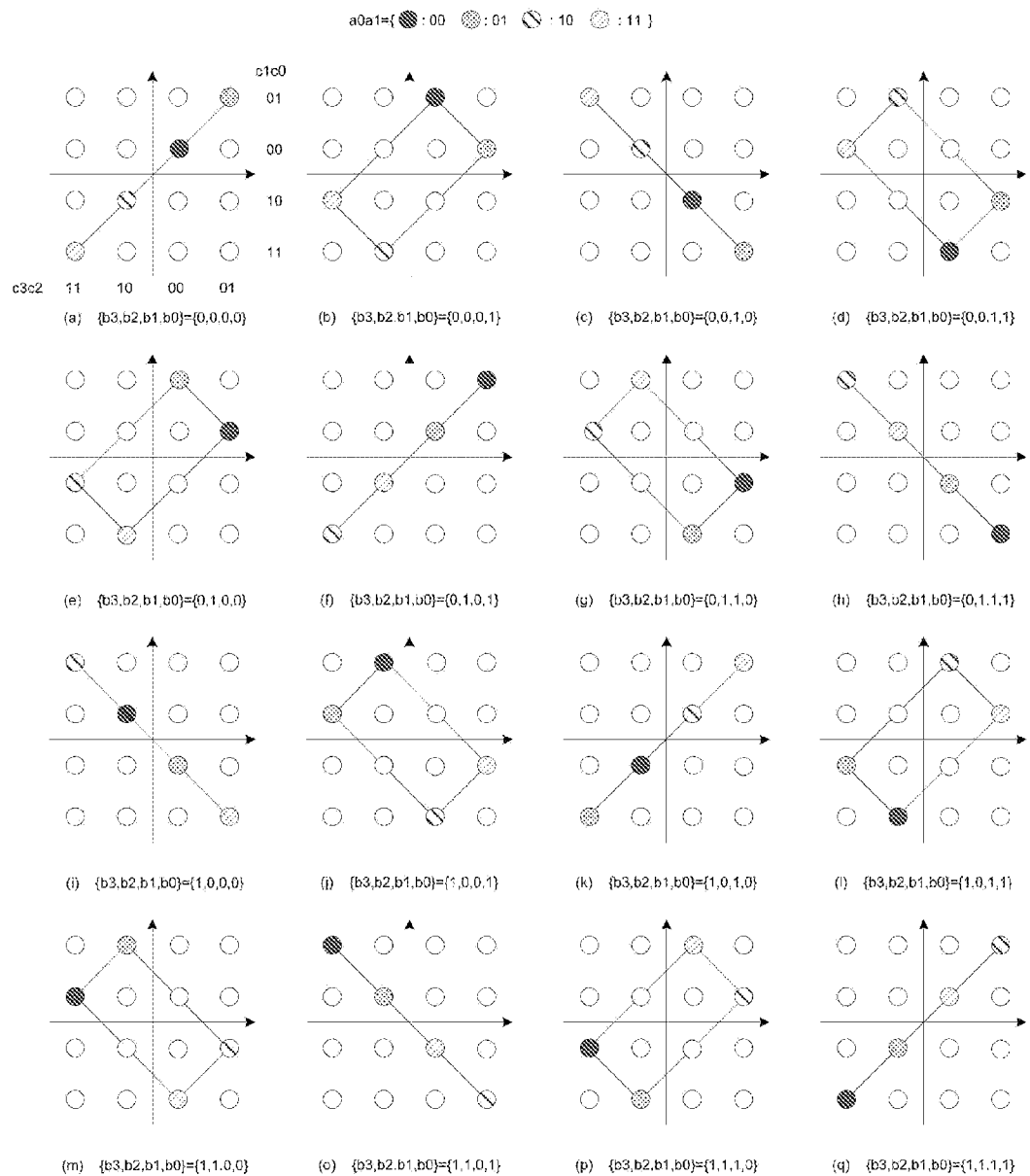
FIG. 11 illustrates the mapping figure of the QPSK constellation during combination of QPSK-16QAM.

Taking the above formula (5) for example, 16QAM has sixteen constellation points, QPSK has four constellation points, and the constellation set after combination of the two has 64 possibilities, so that there are four separating charts for 16QAM, as shown in FIG. 10, while there are 16 separating charts for QPSK, as shown in FIG. 11.

Moreover, for a receiver whose local signal is modulated in low order and is BPSK or QPSK but the received combination signal is modulated in high order, since both BPSK and QPSK are constant modulus modulations (with the modulus value being 1) and have simple bit sequences, the average power and statistic characteristics of the constellation symbols modulated in high order are not changed when the symbols modulated in high order are combined with the BPSK or QPSK symbols, so that the performance of the receiver is the same as the equivalent modulation system without combination and separation operations. For instance, at the receiving end which receives the 16QAM signal in the received QPSK-16QAM combination signal, since the average signal-to-noise ratio of the 16QAM constellation is not changed due to the XOR operation, the receiving performance (packet error rate) is the same as that without combination and separation operations.

However, as for the data modulated in low order and performed with the combination operation (for example, for a QPSK signal in QPSK-16QAM combination signal), or for the combination of two data modulated in high order (the combination of 64QAM-16QAM, for example), since the average power of the constellation points has been changed after combination, the performance of receiver will be different from that without combination and separation operations.

Bit XOR is also a process of changing the mapping chart, and different XOR modes represent different mapping rules.

Figure 15:
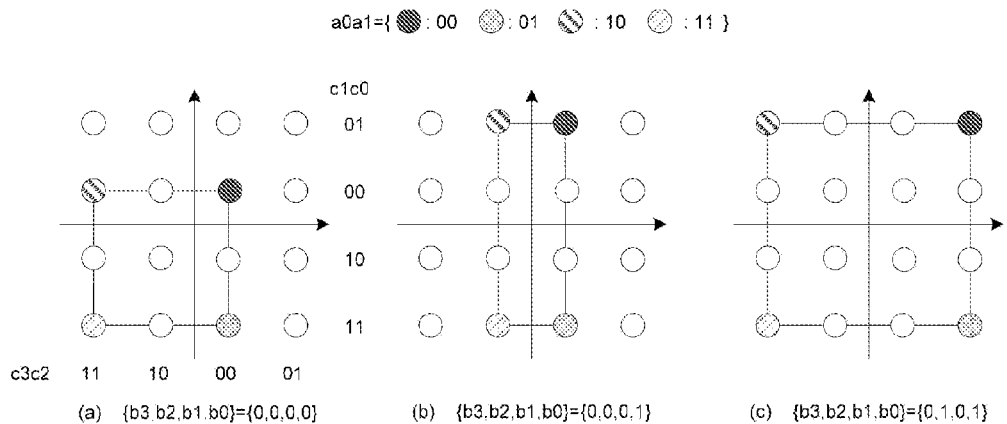
FIGS. 15-17 illustrate examples of mapping figures of QPSK-16QAM combination.

FIG. 15 illustrates examples of mapping charts of formula (4). QPSK mapping charts are provided only when the local reference 16QAM signals are {0,0,0,0}, {0,0,0,1} and {0,1,0,1}, and the other charts can be obtained from formula (4).

Figure 16:
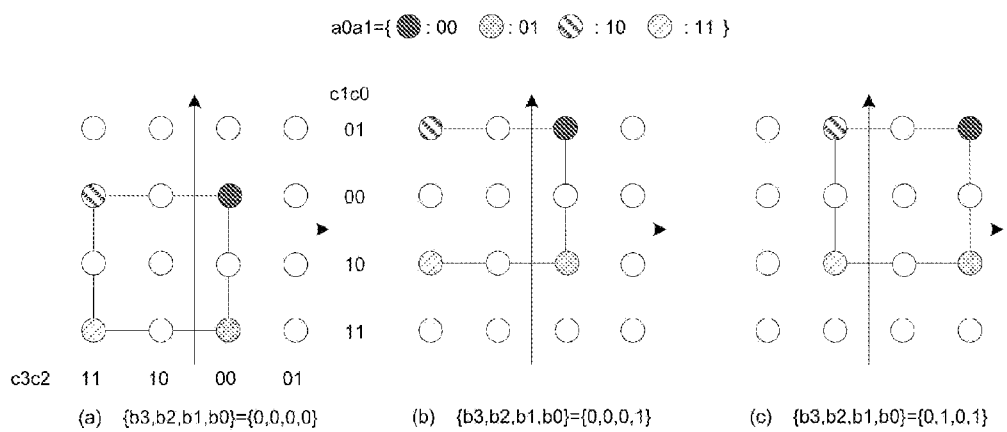

FIG. 16 illustrates examples of mapping charts of formula (6). Three QPSK mapping charts are provided also when the local reference signals are {0,0,0,0}, {0,0,0,1} and {0,1,0,1}.

As can be seen from FIGS. 11-15 and 16, when different modulation symbols are combined, mapping of the low order modulation on the high order modulation constellation has a different mapping chart because of the different mapping rules. For each mapping chart, when the Euclidian distances between symbols are different after mapping of the low order modulation, the anti-noise performances are also different. In other words, different mappings lead to different code error rate performances. In FIG. 11, the mapping of QPSK on the 16QAM constellation has altogether two basic forms, and the other charts are such operations as rotation and exchange of constellation points of these two charts.

According to general principles of the coding theory, the constellation set whose least Euclidian distance between any two random symbols is the biggest has the greatest anti-noise performance. Accordingly, it is also possible to find the best mapping mode according to a certain design criterion for such combination of different modulation symbols. The problem is converted to finding a structure of mapping low order symbols (such as QPSK) in the space of high order symbols (such as 16QAM). This structure can traverse the whole space of the high order symbols (to ensure equal probability distribution of each constellation point), and has the maximum of the smallest Euclidian distance between the symbols (the greatest anti-interference performance). To find the mapping with the maximum of the smallest Euclidian distance between the symbols is the first design criterion of the mapping mode.

In the codeword design criterion, besides the aforementioned maximum criterion of the smallest Euclidian distance, there are also such measuring criteria as the biggest number of pairs of the symbols having the smallest Euclidian distance in the constellation set. For instance, when the smallest Euclidian distances of two mapping modes are equal, the constellation set with less pairs of the symbols having the smallest Euclidian distance has better performance than that of the constellation set with more pairs of symbols.

Figure 17:
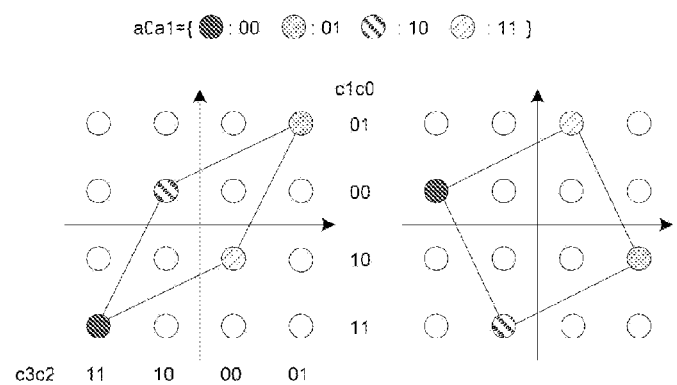

The XOR operation of the aforementioned formulae (3) to (6) is only one concrete example of realizing data combination. The mapping of the XOR operation mode of formulae (3) to (6) can be realized directly by XOR in the actual system. The combination of different modulation modes has the different mapping structure in the realizing hardware module or software. The combination of different modulation data can also be carried out by other modes, such as the lookup table, etc. When one kind of mapping can not be directly realized by explicit XOR or other formulae, it is possible to use the mode of lookup table to perform data combination. That is to say, for two definite bit sequences of different modulation symbols, their corresponding mapping symbols can be obtained via the lookup table. Regardless of whether the mapping structure is XOR or the lookup table, the mapping structure is known to both the receiving and the transmitting parties, as long as the data combination and separation operations correspond on a one-to-one basis for the two modulation data symbols. Taking the mapping in FIG. 17 for example, the 16QAM symbols generated after combination of any random pair of QPSK and 16QAM symbols are listed in Table 2.

TABLE 2

Mapping Lookup Table

| 16QAM | QPSK | | | |
|---|---|---|---|---|
| | 00 | 01 | 10 | 11 |
| 0000 | 0010 | 0101 | 1000 | 1111 |
| 0001 | 0011 | 0100 | 1001 | 1110 |
| 0010 | 0000 | 0111 | 1010 | 1101 |
| 0011 | 0001 | 0110 | 1011 | 1100 |
| 0100 | 0110 | 1100 | 0001 | 1011 |
| 0101 | 0111 | 1101 | 0000 | 1010 |
| 0110 | 0100 | 1110 | 0011 | 1001 |
| 0111 | 0101 | 1111 | 0010 | 1000 |
| 1000 | 1010 | 0000 | 1101 | 0111 |
| 1001 | 1011 | 0001 | 1100 | 0110 |
| 1010 | 1000 | 0010 | 1111 | 0101 |
| 1011 | 1001 | 0011 | 1110 | 0100 |
| 1100 | 1110 | 1001 | 0100 | 0011 |
| 1101 | 1111 | 1000 | 0101 | 0010 |

TABLE 2-continued

Mapping Lookup Table

| 16QAM | QPSK | | | |
|---|---|---|---|---|
| | 00 | 01 | 10 | 11 |
| 1110 | 1100 | 1011 | 0110 | 0001 |
| 1111 | 1101 | 1010 | 0111 | 0000 |

As regards the data combination in Table 2, since there is no corresponding explicit formula or XOR operation, the separation operation of the receiving end should also base on the lookup table to determine the mapping to which the local reference signal corresponds.

Such a lookup table can also be provided for formulae (3) to (6). As previously mentioned, XOR operation is not the exclusive mapping mode, as there are also other feasible operation examples, while only the two possible data combination modes of XOR and the lookup table are herein exemplified.

Figure 18:
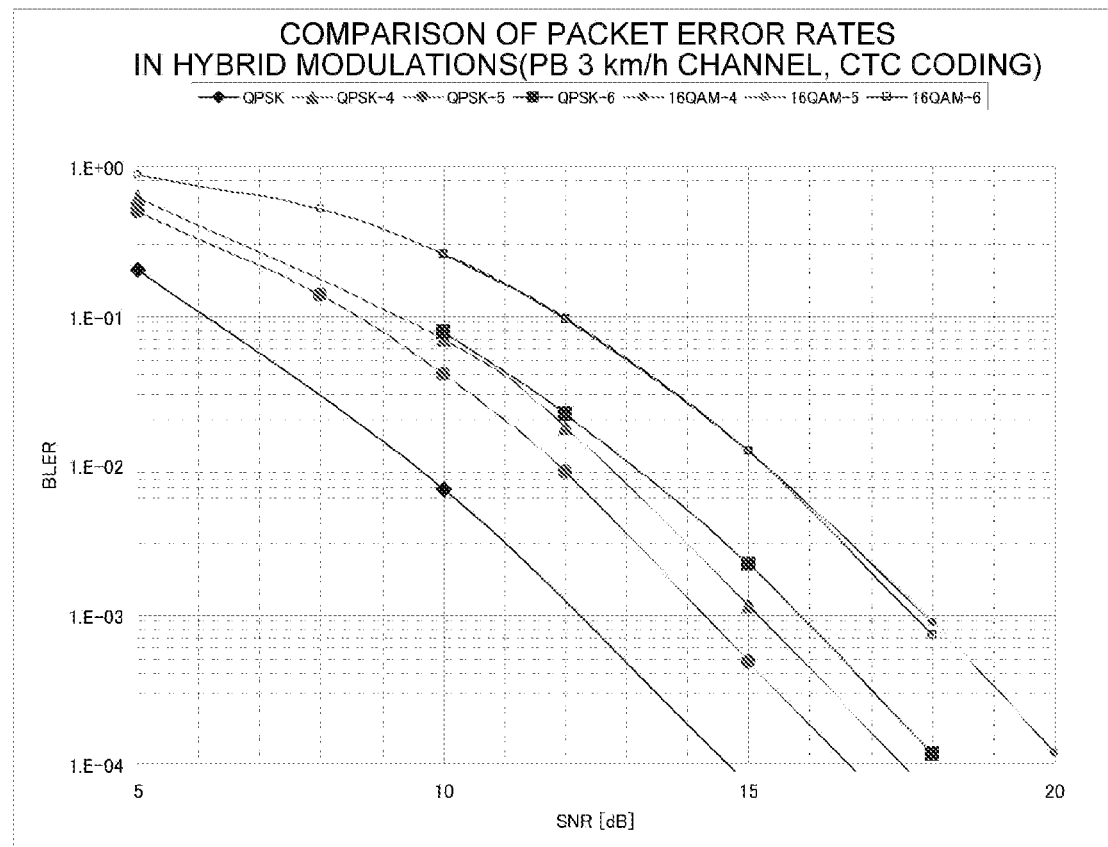
FIG. 18 illustrates comparison of performances of packet error rates between different modes of combining QPSK-16QAM.

As verification of the method of the present invention, this paper provides packet error rate curves with regard to 16QAM and QPSK at two data receiving ends of the separation operations corresponding to formulae (4), (5) and (6), as shown in FIG. 18. We suppose in simulation that the relay station has precisely received two source data information. The QPSK-4 curve represents the packet error rate of QPSK in the hybrid modulation of formula (4), 16QAM-6 represents the packet error rate of 16QAM in the hybrid modulation of formula (6), and QPSK represents the general QPSK modulation performance. As can be seen, under different mapping modes, the receiving performance of 16QAM data is the same as that of the general communications system, while the receiving performance of QPSK varies with variations of the different mapping modes. Of these three mapping modes, the performance of formula (5) is the best.

The data combination and separation operations of other PSK and QAM modulation modes are similar to the method mentioned above, and certain formulae of possible bit XOR modes are given here. The formulae for the combination operation of QPSK ($\{a_0,a_1\}$)-64QAM ($\{b_0,b_1,b_2,b_3,b_4,b_5\}$) are as follows:

$$\{c_0,c_1,c_2,c_3,c_4,c_5\}=\{a_0\oplus b_0,b_1,b_2,a_1\oplus b_3,b_4,b_5\} \quad (18)$$

$$\{c_0,c_1,c_2,c_3,c_4,c_5\}=\{a_0\oplus b_0,a_0\oplus b_1,a_0\oplus b_2,a_1\oplus b_3, a_1\oplus b_4,a_1\oplus b_5\} \quad (19)$$

The following formulae can be employed for the combination of 16QAM($\{a_0,a_1\}$)-64QAM($\{b_0,b_1,b_2,b_3,b_4,b_5\}$):

$$\{c_0,c_1,c_2,c_3,c_4,c_5\}=\{a_0\oplus b_0,b_1,a_1\oplus b_2,b_3,a_2\oplus b_4,b_5\} \quad (20)$$

$$\{c_0,c_1,c_2,c_3,c_4,c_5\}=\{b_0,a_0\oplus b_1,b_2,a_1\oplus b_3,b_4,a_2\oplus b_5\} \quad (21)$$

$$\{c_0,c_1,c_2,c_3,c_4,c_5\}=\{a_0\oplus b_0,a_0\oplus b_1,a_1\oplus b_2,a_1\oplus b_3, a_2\oplus b_4,a_2\oplus b_5\} \quad (22)$$

$$\{c_0,c_1,c_2,c_3,c_4,c_5\}=\{a_0\oplus b_0,a_0\oplus b_1,a_1\oplus b_2,a_1\oplus b_3, a_2\oplus b_4,a_2\oplus b_5\} \quad (23)$$

The following formulae can be employed for the modulations of QPSK($\{a_0,a_1\}$) and BPSK($\{b\}$):

$$\{c_0,c_1\}=\{a_0\oplus b,a_1\oplus b\} \quad (24)$$

$$\{c_0,c_1\}=\{a_0\oplus b,a_1\} \quad (25)$$

$$\{c_0,c_1\}=\{a_0,a_1\oplus b\} \quad (26)$$

Since QPSK and BPSK are constant modulus modulations, the XOR operation does not affect the receiving performance of the data modulated in high order combined therewith. But for the pairs of 16QAM-64QAM symbols, the average power of the data modulated in low order (16QAM) might be changed when the hybrid modulation and combination of symbols are realized by the bit sequence XOR in this paper, so that the receiving performance thereof will also be affected. It is likewise possible to find one or more modes with better performance for the plurality of possible mapping modes. The method of theoretical analysis or the method of computer searching can be used to find better mapping modes.

Figure 19:
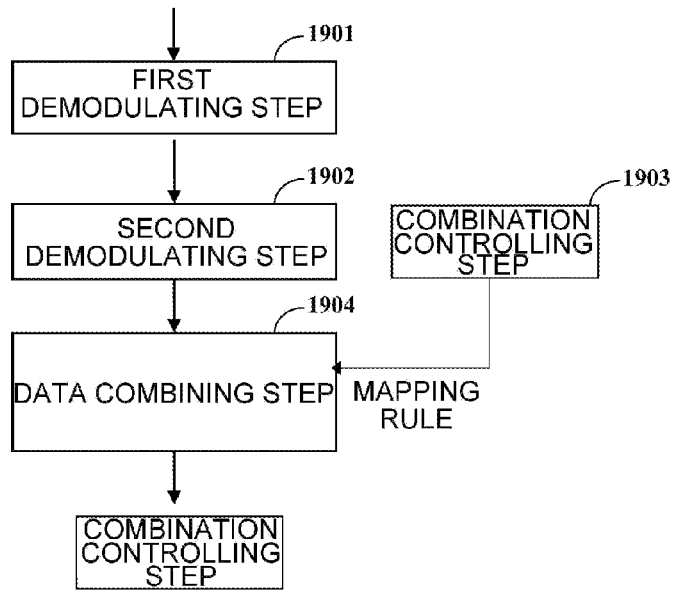
FIG. 19 is a flowchart illustrating the data relay method according to one embodiment of the present invention.

FIG. 19 is a flowchart illustrating the data relay method according to one embodiment of the present invention.

As shown in FIG. 19, firstly in Step 1901, the first demodulating unit 801 demodulates the modulation signal from the first transmission source, the modulation mode of the modulation signal from the first transmission source is a first modulation mode. Simultaneously or thereafter in Step 1902, the second demodulating unit 802 demodulates the modulation signal from the second transmission source, wherein the modulation mode of the modulation signal from the second transmission source is a second modulation mode higher in modulation order than the first modulation mode. In Step 1903, which is simultaneous with or after Steps 1901 and 1902, the combination controlling unit performs a combination controlling step, namely, to provide a mapping rule that should be employed in accordance with the modulation mode of the modulation signal from the first transmission source and the modulation mode of the modulation signal from the second transmission source, and the mapping rule is a rule as how to map the demodulated modulation signal from the first transmission source and the demodulated modulation signal from the second transmission source together on the constellation of the symbols of the second modulation mode. Finally, in the data combining Step 1904, the data combining unit performs data combination on the demodulated modulation signal from the first transmission source and the demodulated modulation signal from the second transmission source in accordance with the mapping rule provided by the combination controlling unit.

Moreover, when the modulation signal from the first transmission source is a coded signal, there can also be included a first decoding step and a first coding step. In the first decoding step, the modulation signal from the first transmission source is decoded, and in the first coding step the signal decoded in the first decoding step is re-coded. The coding mode employed in the re-coding can be different from the original mode of coding the modulation signal from the first transmission source.

Furthermore, when the modulation signal from the second transmission source is a coded signal, there can also be included a second decoding step and a second coding step. In the second decoding step the modulation signal from the second transmission source is decoded, and in the second coding step the signal decoded in the second decoding step is re-coded. The coding mode employed in the recoding can be different from the original mode of coding the modulation signal from the second transmission source.

Figure 20:
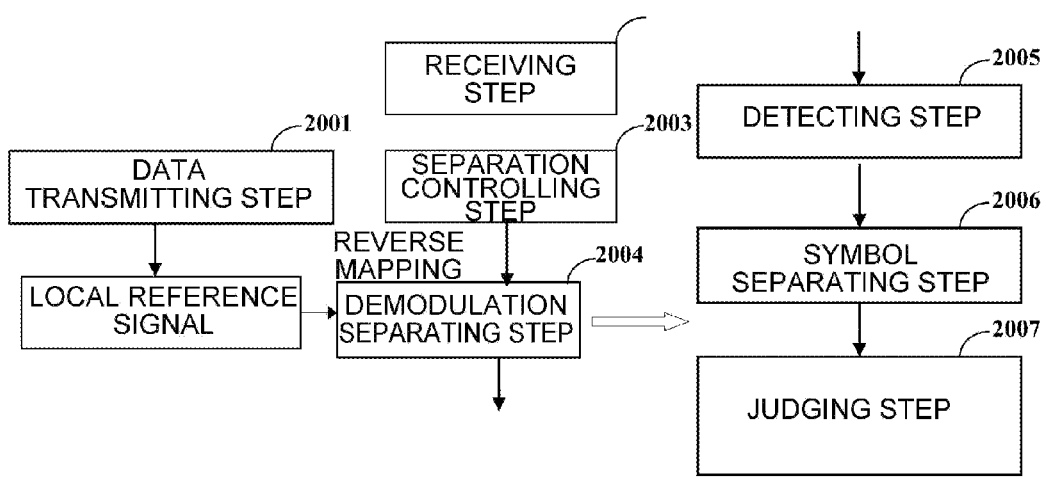
FIG. 20 is a flowchart illustrating the data separating method according to one embodiment of the present invention.

FIG. 20 is a flowchart illustrating the data separating method according to one embodiment of the present invention. As shown in FIG. 20, firstly in the transmitting Step 2001, a modulation signal of a first modulation mode or a modulation signal of a second modulation mode is transmitted, wherein the second modulation mode is higher in modulation order than the first modulation mode, and the transmitted signal is simultaneously stored as a local reference signal.

On the other hand, in the receiving Step 2002, a combination data of the second modulation mode combined from the first modulation data of the first modulation mode with the second modulation data of the second modulation mode is received. Subsequently in the separating control Step 2003, a reverse mapping rule is provided, namely a rule that maps the constellation points in the constellation of the symbols in the combination data into bits of a modulation mode desired to be received, in accordance with the first modulation mode, the second modulation mode, and whether the modulation mode of the modulation signal transmitted by the transmitting unit is the first modulation mode or the second modulation mode. The reverse mapping rule can be a rule that can be expressed by formulae or can be a rule that cannot be expressed by formulae. As previously mentioned, when the reverse mapping rule cannot be expressed by formulae, it can be expressed in the form of a table. Then in the demodulation separating Step 2004, data desired to be received is separated from the combination data in accordance with the reverse mapping rule determined by the separation controlling unit.

In the embodiment shown in FIG. 20, the demodulation separating Step 2004 specifically includes a detecting step 2005, wherein the detecting unit 3001 performs symbol detection on the received signal; a symbol separating step 2006, wherein the symbol separating unit 3003 separates the constellation points of the symbols of the data desired to be received from the combination data in accordance with the reverse mapping rule; and a judging step 2007, wherein the judging unit 3002 judges the bit values of the constellation points of the symbols separated by the symbol separating unit, so as to obtain the data desired to be received.

Apparently, in the above embodiment, the processing of the demodulation separating Step 2004 is the same as the processing of the data separating device in FIG. 9(c), but in other embodiments, it is also possible to differentiate the high order combination signals from the low order combination signals, and to assume different processings corresponding to the processings of the data separating device shown in FIGS. 9(b) and 9(c). Under such circumstance, a determining step can be added to determine whether the received signal is a high order combination signal or a low order combination signal. This is because it can be clearly known with reference to FIGS. 9(b), 9(c) and 20 that these steps are realizable, so that these are not redundantly explained here.

According to the embodiments of the present invention, when signal-to-noise ratios of two links differ much from each other, It is possible to excellently match the imbalance of the throughput, so as to enhance the transmission capability of the system. The present invention is also applicable to other suitable scenarios such as network communication.

The invention claimed is:

1. A data relay apparatus, comprising:
a first demodulating unit, for demodulating a modulation signal from a first transmission source, modulation mode of the modulation signal from the first transmission source being a first modulation mode;
a second demodulating unit, for demodulating a modulation signal from a second transmission source, the modulation mode of the modulation signal from the second transmission source being a second modulation mode with a higher modulation order than the first modulation mode;
a combination controlling unit, for providing mapping rule necessary for performing signal combination in accordance with the modulation mode of the modulation signal from the first transmission source and the modulation mode of the modulation signal from the second transmission source, the mapping rule being rule as how to map the demodulated modulation signal from the first transmission source together with the demodulated modulation signal from the second transmission source to a constellation of symbols of the second modulation mode; and a data combining unit, for performing data combination on the demodulated modulation signal from the first transmission source and the demodulated modulation signal from the second transmission source in accordance with the mapping rule provided by the combination controlling unit.

2. The data relay apparatus according to claim 1, wherein the mapping rule is expressed by formulae or expressed by table.

3. The data relay apparatus according to claim 1, wherein the mapping rule is such a rule that performs a bit XOR operation on all bits of one data symbol of the first modulation mode and partial or all bits of one data symbol of the second modulation mode to obtain the data symbol of the second modulation mode.

4. The data relay apparatus according to claim 1, wherein the modulation signal from the first transmission source and the modulation signal from the second transmission source are coded signals, and that the data relay apparatus further comprises:
  a first decoding unit, for decoding the demodulated modulation signal from the first transmission source;
  a first coding unit, for coding the signal decoded by the first decoding unit;
  a second decoding unit, for decoding the demodulated modulation signal from the second transmission source; and
  a second coding unit, for coding the signal decoded by the second decoding unit;
  wherein the data combining unit combines data from the first coding unit with data from the second coding unit.

5. A communication apparatus, comprising:
  a transmitting unit, for transmitting a modulation signal of a first modulation mode or a modulation signal of a second modulation mode, modulation order of the second modulation mode being higher than modulation order of the first modulation mode;
  a demodulation separating unit, for receiving combined data of the second modulation mode combined from a first modulation data of the first modulation mode with a second modulation data of the second modulation mode, and demodulating and separating a signal desired to be received from the combined data; and
  a separation controlling unit, for providing signal inverse mapping rule in accordance with the first modulation mode, the second modulation mode and modulation mode of the modulation signal transmitted by the transmitting unit is the first modulation mode or the second modulation mode, the inverse mapping rule being a rule of mapping constellation points in a constellation of symbols in the combined data into bits of the modulation mode desired to be received;
  wherein the demodulation separating unit separates data desired to be received from the combined data in accordance with the inverse mapping rule determined by the separation controlling unit.

6. The communication apparatus according to claim 5, wherein the inverse mapping rule is expressed by formulae or expressed by table.

7. The communication apparatus according to claim 5, wherein the demodulation separating unit comprising:
  a detecting unit, for performing symbol detection on a received signal;
  a symbol separating unit, for separating constellation points of symbols of the data desired to be received from the combined data in accordance with the inverse mapping rule; and
  a judging unit, for judging bit values of the constellation points of symbols separated by the symbol separating unit to obtain the data desired to be received.

8. The communication apparatus according to claim 5, wherein the communication apparatus further comprises a determining unit for determining whether the modulation order of the modulation mode of a combined signal as received is higher than the modulation order of the modulation mode of the modulation signal transmitted by the transmitting unit; and wherein
  the demodulation separating unit comprises a detecting unit, a judging unit and a symbol separating unit, of which the detecting unit performs symbol detection on a received signal;
  wherein when the determining unit determines that the modulation order of the modulation mode of the combined signal as received is higher than the modulation order of the modulation mode of the modulation signal transmitted by the transmitting unit, the judging unit judges bit values of the constellation points of symbols detected by the detecting unit; and the symbol separating unit separates the data desired to be received from the combined data in accordance with the inverse mapping rule and the bit values judged by the judging unit;
  and wherein when the determining unit determines that the modulation order of the modulation mode of the combined signal as received is not higher than the modulation order of the modulation mode of the modulation signal transmitted by the transmitting unit, the symbol separating unit separates the constellation points of symbols of the data desired to be received from the combined data in accordance with the inverse mapping rule, and the judging unit judges bit values of the constellation points of symbols separated by the symbol separating unit to obtain the data desired to be received.

9. The communication apparatus according to claim 5, wherein the inverse mapping rule is determined by maximum criterion of minimum Euclidean distance, or determined by maximum criterion of minimum Euclidean distance and criterion of minimum number of symbol pairs of minimum Euclidean distance.

10. A communication method, comprising:
  transmitting a modulation signal of a first modulation mode or a modulation signal of a second modulation mode, modulation order of the second modulation mode being higher than modulation order of the first modulation mode;
  receiving combined data of the second modulation mode combined from a first modulation data of the first modulation mode with a second modulation data of the second modulation mode;
  providing signal inverse mapping rule in accordance with the first modulation mode, the second modulation mode and the modulation mode of the modulation signal transmitted in the transmitting is the first modulation mode or the second modulation mode, the inverse mapping rule being a rule of mapping constellation points in a constellation of symbols in the combined data into bits of the modulation mode desired to be received; and
  separating data desired to be received from the combined data in accordance with the inverse mapping rule determined in the providing.

* * * * *